United States Patent [19]

Marshall et al.

[11] 3,824,885

[45] July 23, 1974

[54] METHOD AND APPARATUS FOR PRODUCING WEIGHT CONTROLLED GROUPS OF SLICED FOOD PRODUCT

[75] Inventors: Robert Howard Marshall, Hinsdale; Gary Leonard Wallace, Oak Lawn, both of Ill.

[73] Assignee: Chemetron Corporation, Chicago, Ill.

[22] Filed: Sept. 28, 1972

[21] Appl. No.: 293,045

[52] U.S. Cl. .................................... 83/19, 83/176
[51] Int. Cl. ........................... B26d 7/08, B26d 4/22
[58] Field of Search ............ 83/14, 19, 176, 73, 77, 83/580; 425/311

[56] References Cited
UNITED STATES PATENTS

| | | | |
|---|---|---|---|
| 2,332,170 | 10/1943 | Sapp | 425/311 |
| 2,342,093 | 2/1944 | Weida | 425/311 |
| 3,318,351 | 5/1967 | Werder | 83/92 |
| 3,428,001 | 2/1969 | Zwart, Jr. et al. | 425/311 X |
| 3,516,312 | 6/1970 | Nordberg et al. | 83/580 X |

*Primary Examiner*—Willie G. Abercrombie

[57] ABSTRACT

A method and apparatus for producing weight controlled stacks of counted slices cut from an elongated mass of food product includes means for feeding the mass longitudinally along a downward feed path into a cutting path normal thereto, a rotary knife movable around the cutting path to cut slices from the mass, means below the cutting path for accumulating a selected number of the slices into a group, means positioned below the accumulating means for weighing a group of slices and producing a signal in response to the weight thereof, means for removing the group from the weighing means after the signal is produced, means for varying the rotary speed of the knife around the cutting path according to the weight signal, and means for accepting or rejecting weighed groups in response to the weight signal.

14 Claims, 18 Drawing Figures

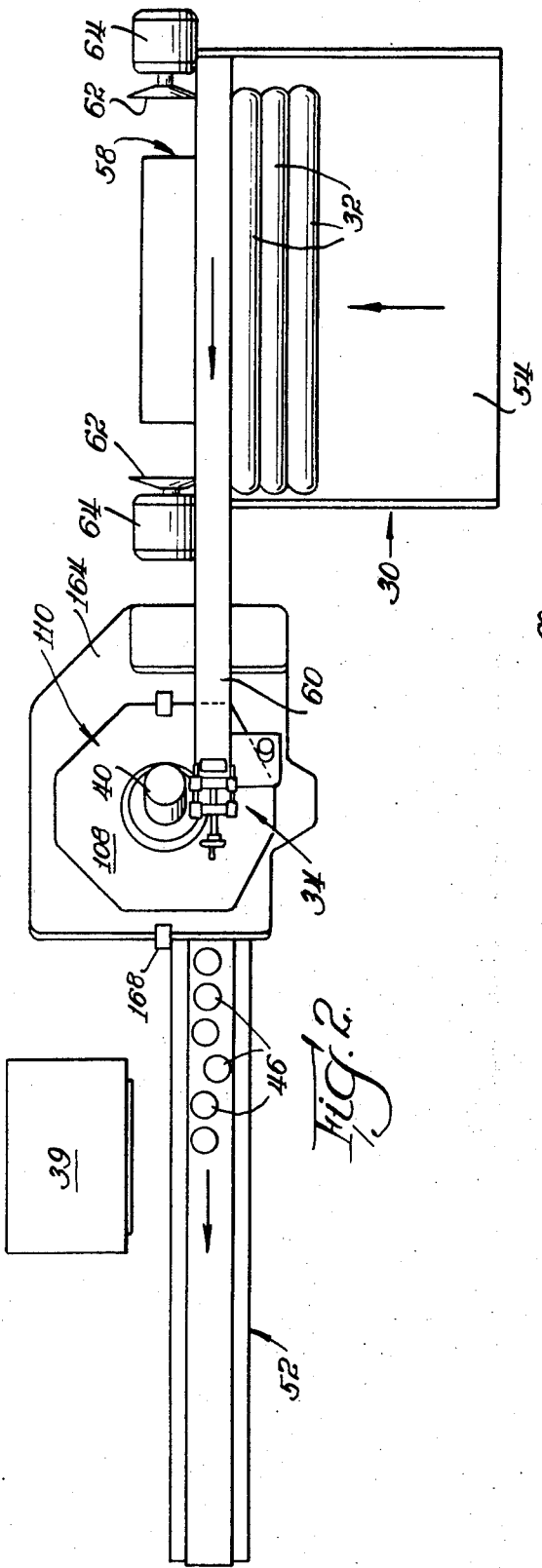
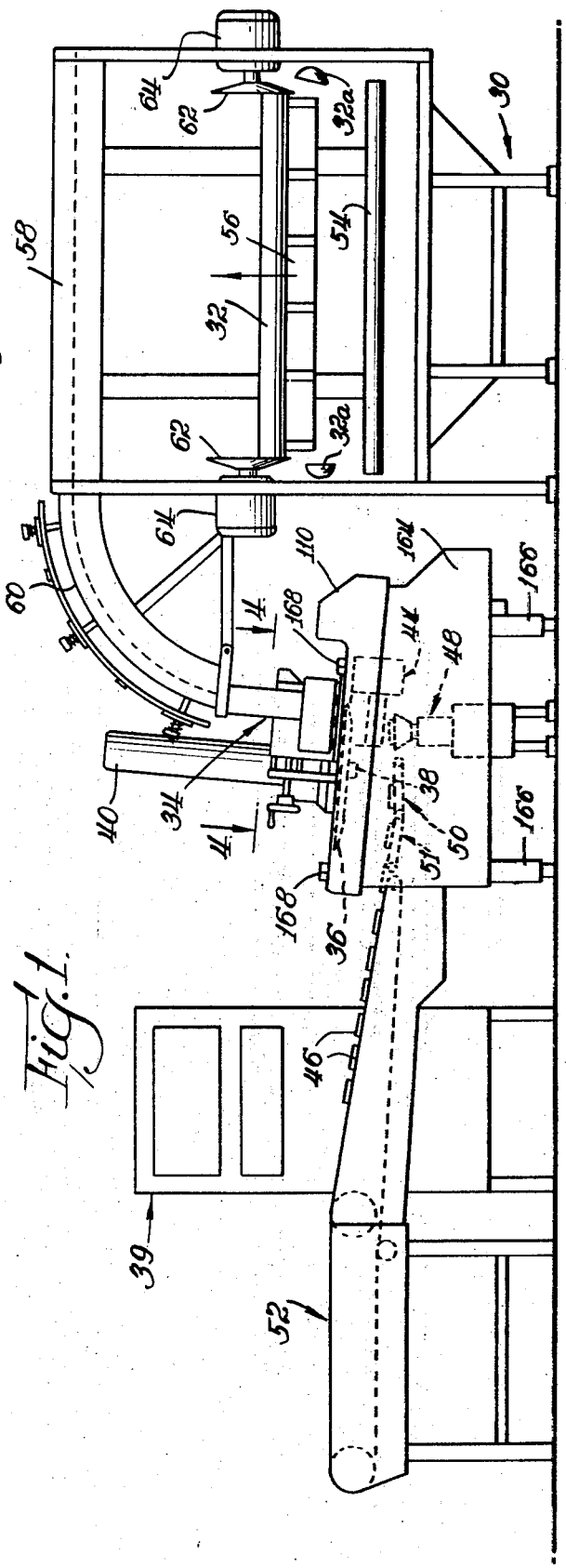

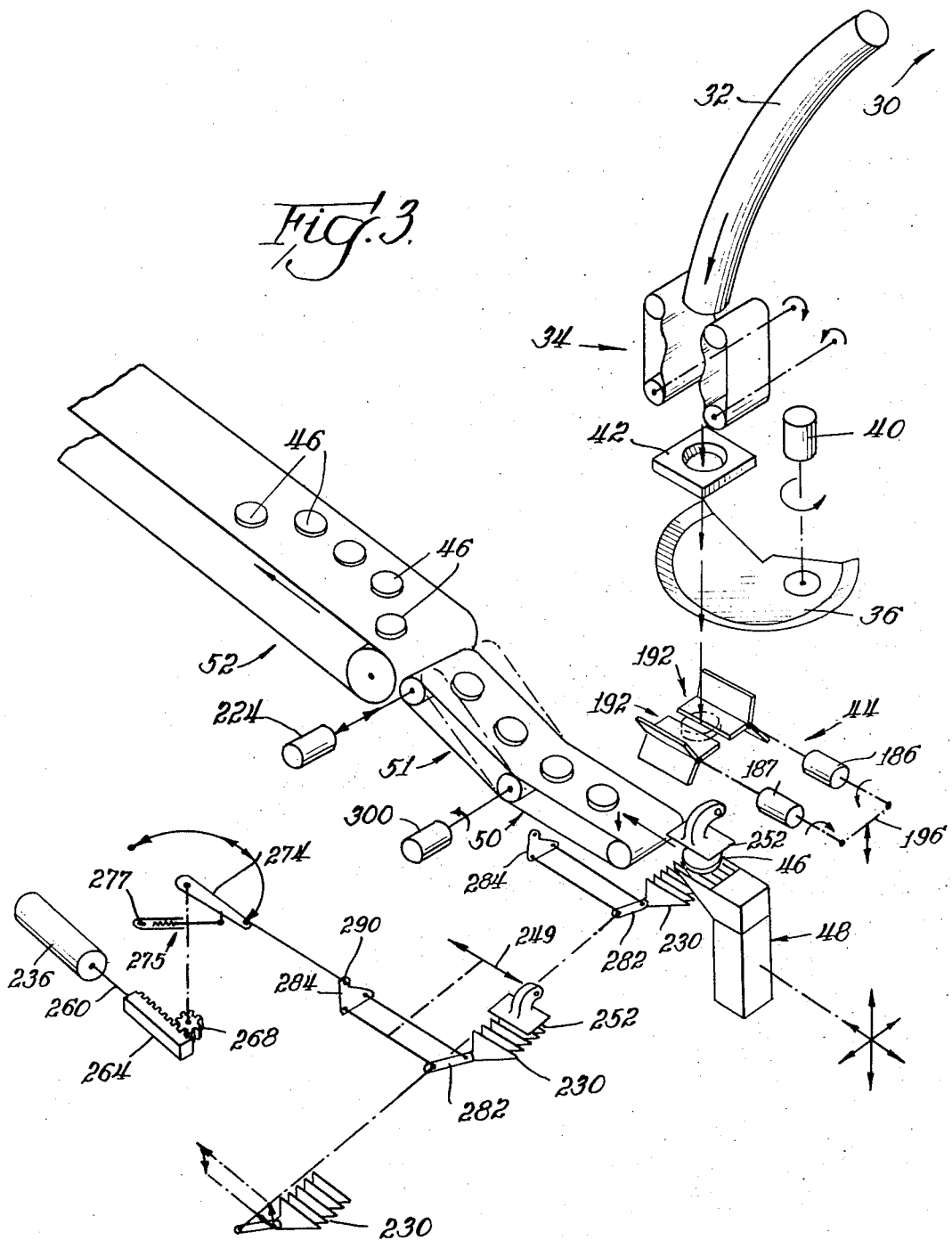

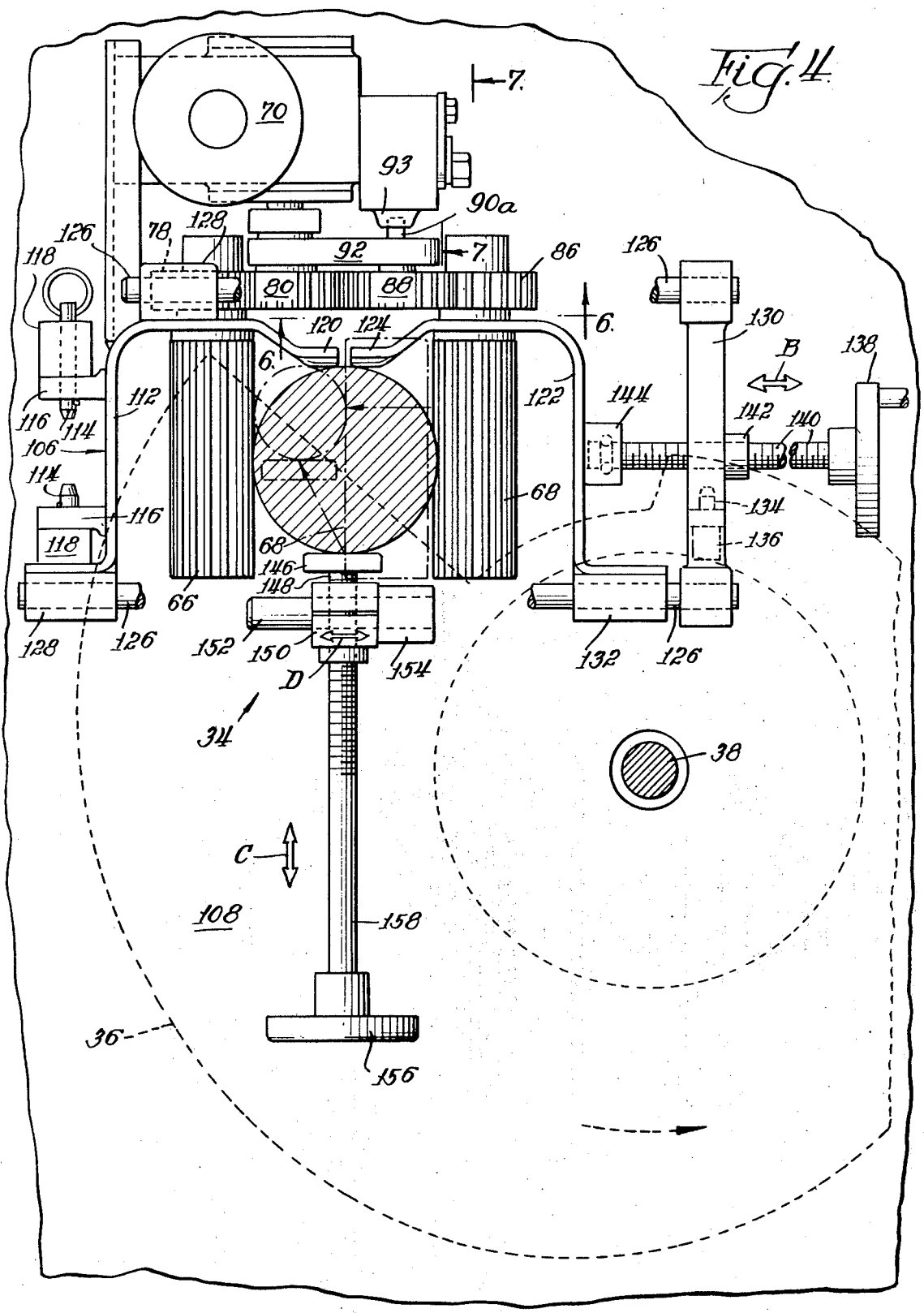

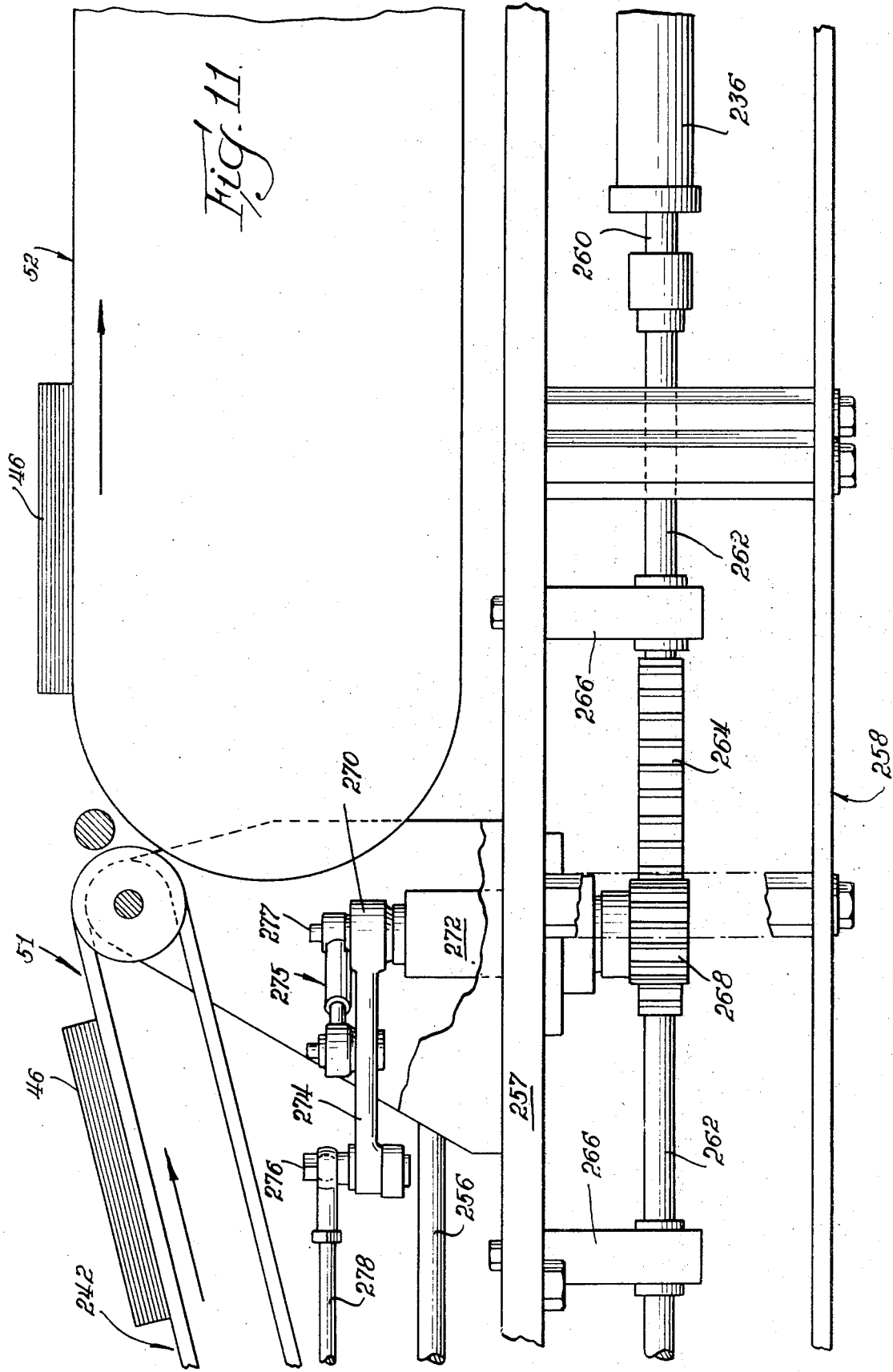

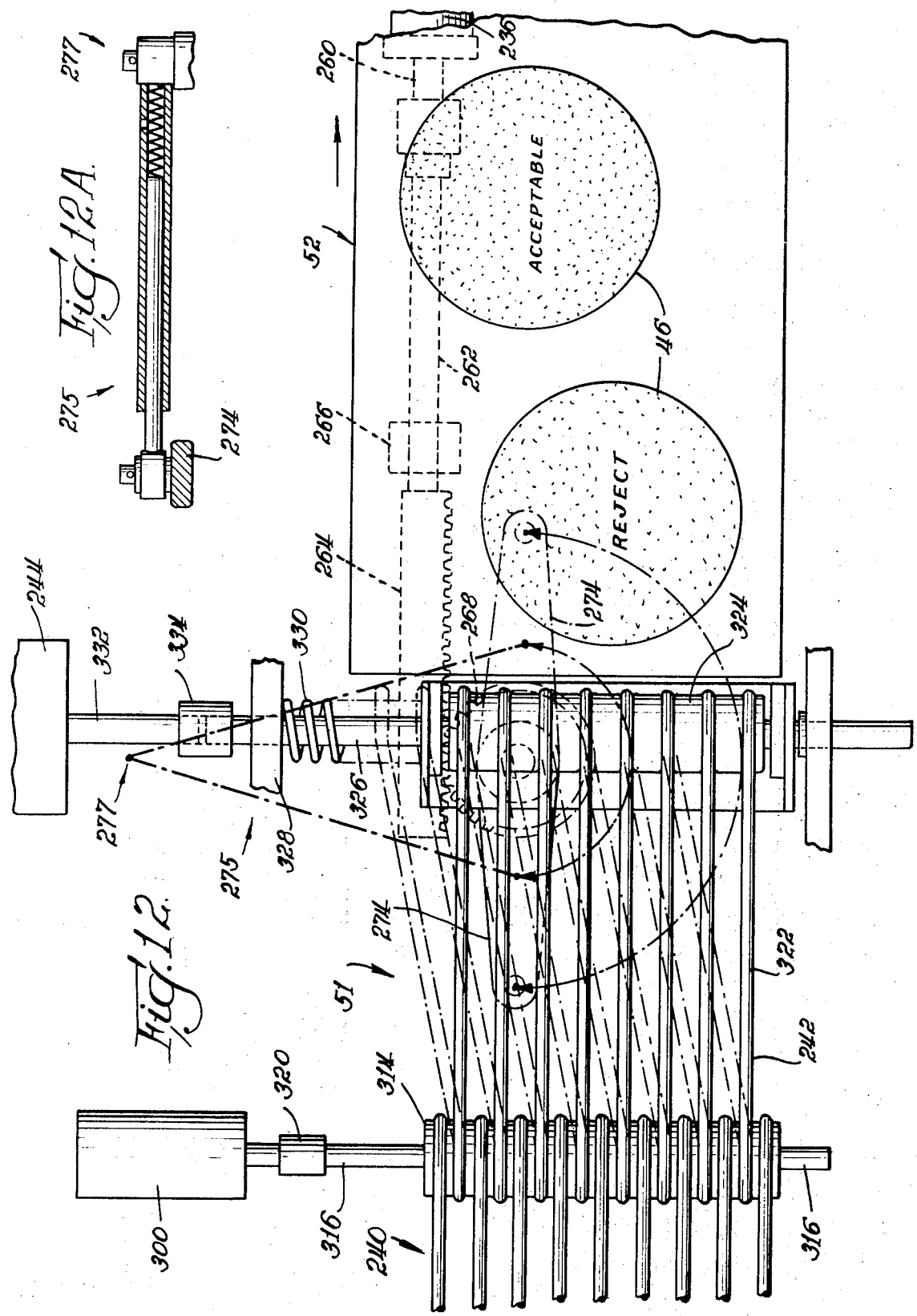

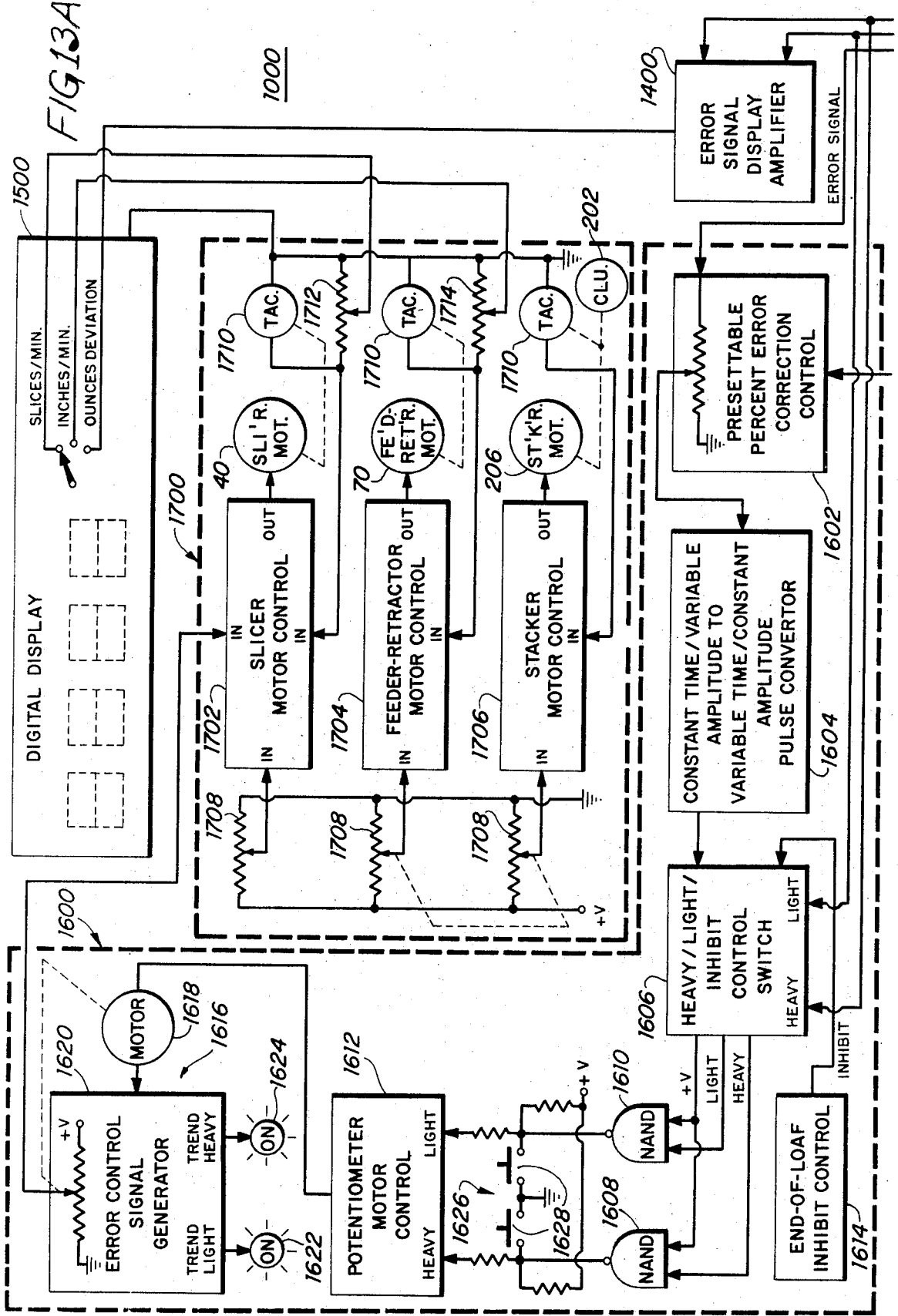

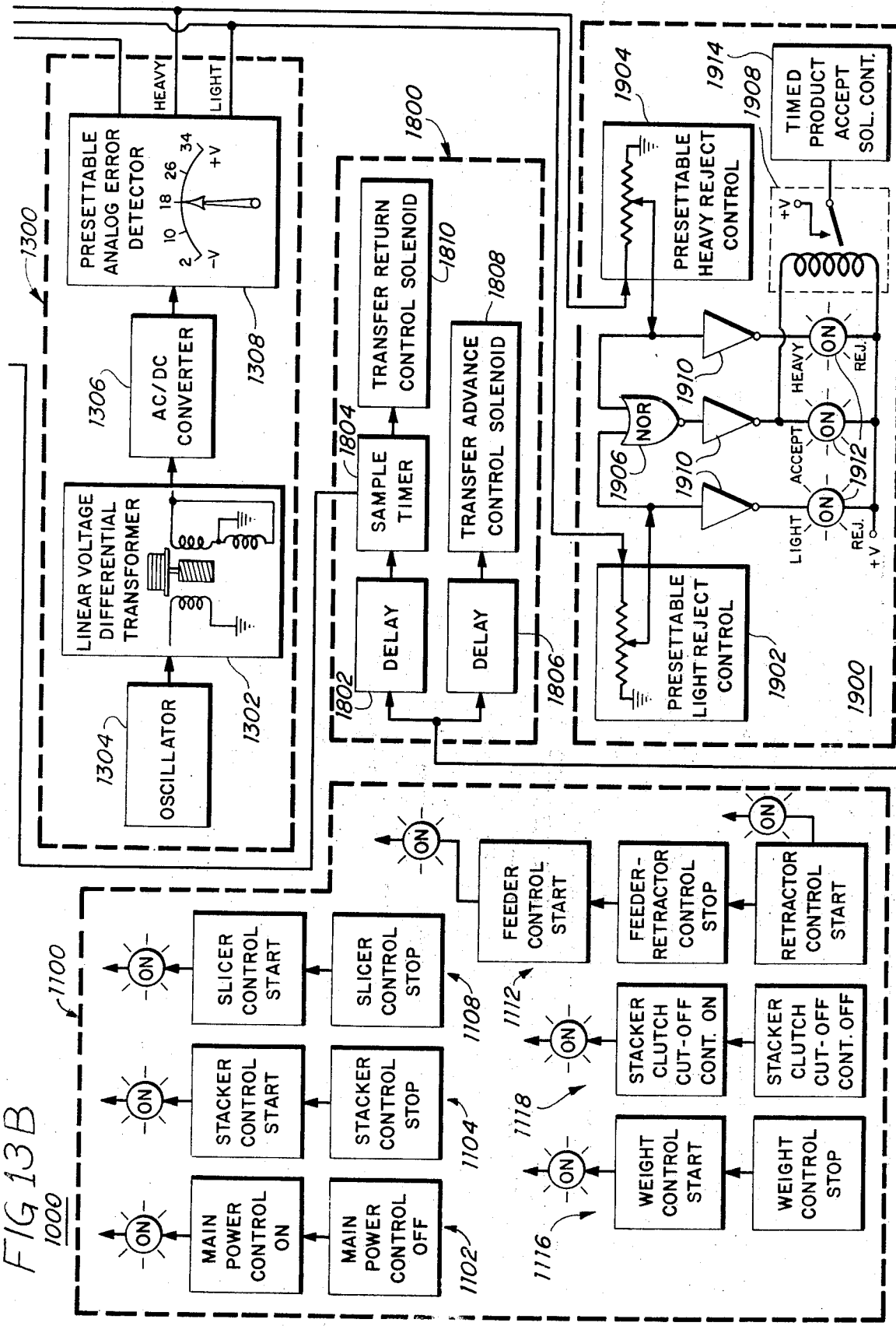

METHOD AND APPARATUS FOR PRODUCING WEIGHT CONTROLLED GROUPS OF SLICED FOOD PRODUCT

The present invention is directed towards a new and improved method and apparatus for producing weight controlled stacks or groups of counted slices cut from an elongated mass or loaf of a food products such as cold cuts, sausage, cheese or the like. Food products such as process cheese, luncheon meats, bologna, salami and the like are produced in elongated loaves, often 4 to 6 feet long, having generally uniform cross-sections of various shapes and dimensions. These products are sold at retail outlets to the consuming public in relatively small packages containing a selected number of relatively thin slices cut transversely from the loaf.

In commercial practice, each package containing a stack or other group of counted slices must have a net food product weight exceeding or at least equal to a weight printed or otherwise indicated on the package. It is desirable to produce such packages which closely meet the weights indicated on the packages with a minimum number of underweight rejects. Also it is very important to minimize the amount of excess food product furnished above the weights indicated on the packages. Thus, great savings can be obtained by mass producing the packages within close tolerances on an automatic weight-controlled slicing system capable of operating at high production rates.

Prior cutters and weighers are capable of maintaining production rates of only about 20 percent of the production rate of the apparatus of the present invention. Accordingly, the present invention provides great economic savings in terms of an increased production rate, a reduction in the occurrence of underweight and overweight packages and a significant savings in labor cost per package.

It is therefore an object of the present invention to provide a new and improved method and apparatus for producing weight controlled stacks of counted slices cut from an elongated mass or loaf of food product.

Another object of the present invention is to provide a new and improved method and apparatus of the character described, which is capable of operating at high production rates and maintaining a low percentage of underweight rejects while at the same time minimizing the amount of excess packaged food product above the minimum package weight required.

Another object of the present invention is to provide a new and improved apparatus of the character described which is extremely fast and reliable in operation and which is automatic from the time that a loaf of food product is first introduced into the system until after the weight classified stacks or other groups of counted slices leave the system for further handling.

Another object of the present invention is to provide a new and improved slicer for continuously cutting successive slices from an elongated loaf of food product wherein the loaf is moved uninterruptedly along a feed path into a cutting path and wherein a speed adjustable rotary knife is provided for cutting successive slices from the loaf at a rotary speed controlled according to the weight of the slices.

Another object of the present invention is to provide a slicer having a new and improved feeder for feeding a loaf of food product along a feed path into the cutting path of a rotary knife.

Another object of the present invention is to provide a new and improved slicer of the character described wherein the loaf is fed through a restricted orifice located above the cutting path of the knife for compressively holding and positively aligning the loaf at a level closely adjacent to the cutting path of the knife.

Another object of the present invention is to provide a new and improved slicer of the character described wherein the orifice is tapered inwardly in the direction of the feeding of the loaf.

Another object of the present invention is to provide a new and improved slicer of the character described wherein the margin of the orifice is positioned to provide a shearing surface cooperating with the knife in the cutting of successive slices from the loaf.

Another object of the present invention is to provide a new and improved slicer for cutting successive slices from elongated loaves of food product wherein the speed of a rotary knife is varied in response to a signal produced from a slice weight measuring means.

Another object of the present invention is to provide a new and improved slicer of the character described in combination with a stacker for accumulating slices cut successively from a loaf and for separating the slices into separate groups containing a selected number of slices.

Another object of the present invention is to provide a new and improved stacker of the character described wherein each successive slice cut from a loaf falls a substantially constant distance onto a receiver movable downwardly at a rate infinitely variable within a range to equal substantially the rate at which the loaf is fed to be sliced.

Another object of the present invention is to provide a new and improved stacker of the character described having means for rapidly releasing a group of a counted number of accumulated slices without interruption of the succession of slices from the cutter supplied to the stacker.

Another object of the present invention is to provide a new and improved stacker of the character described which does not require interruption of the feed of the loaf during the time a group of counted slices is released by the stacker.

Another object of the present invention is to provide a new and improved stacker of the character described operable to rapidly deposit an accumulated stack of slices onto a weighing device.

Another object of the present invention is to provide a new and improved weighing system capable of accurately weighing an accumulated group of slices and producing a signal in response thereto.

Another object of the present invention is to provide a new and improved weighing system of the character described wherein the signal produced represents a deviation in the weight of a group of slices from a selected reference weight.

Another object of the present invention is the provision of a new and improved control means for automatically controlling the apparatus of the present invention to divide an elongated mass of a food product into a plurality of separate groups, each group containing a plurality of separate members, said control means including means for weighing each of the groups and for determining whether the weight of each of the groups is within a predetermined acceptable weight range.

Another object of the present invention is the provision of a new and improved control means for automatically controlling the apparatus of the present invention to divide an elongated mass of a food product into a plurality of separate groups, each group having a plurality of separate members, wherein the control means includes means for weighing each of the groups and for generating an error signal indicative of the amount by which the weight of each of the groups differs from a predetermined desired weight.

Another object of the present invention is the provision of a new and improved control means for automatically controlling the apparatus of the present invention to divide an elongated mass of a food product into a plurality of separate groups, each group having a plurality of separate slices, wherein the control means includes a slicer mechanism having means for adjusting the slicing rate in response to a signal indicative of the amount by which the weight of each of the groups differs from a predetermined desired weight.

Another object of the present invention is to provide new and improved means for dividing an elongated mass of a food product into a plurality of separate groups, each group having a plurality of separate slices, and means for forming the plurality of separate groups, wherein the forming means includes means for receiving the slices to form the separate groups sequentially, and means for discharging each sequentially formed group from the receiving means in response to a control signal.

Another object of the present invention is the provision of new and improved means for dividing an elongated mass into a plurality of separate groups, each group having a plurality of separate members, wherein the dividing means includes a slicing mechanism for forming the separate members and means for increasing the speed of the slicing mechanism in response to the receipt of a signal indicating that the weight of one of the plurality of groups of separate members is greater than a predetermined desired weight.

Another object of the present invention is to provide new and improved means for dividing an elongated mass into a plurality of separate groups, each group having a plurality of separate members, wherein the dividing means includes a slicing mechanism for forming the separate members and means for decreasing the speed of the slicing mechanism in response to the receipt of a signal indicating that the weight of one of the plurality of separate groups of separate members is less than a predetermined desired weight.

Another object of the present invention is to provide new and improved means for dividing an elongated mass into a plurality of separate groups, each group having a plurality of separate members, wherein the dividing means includes means for controllably discharging each of the groups of separate members along one of two discharge paths dependent upon the presence or absence of a control signal.

Another object of the present invention is to provide new and improved means for dividing an elongated mass into a plurality of separate groups, each group having a plurality of separate members, wherein the dividing means includes means for discharging one of the groups of separate members along a first of two discharge paths in response to the receipt of a control signal indicating that the weight of that one group is outside of a predetermined acceptable weight range.

Another object of the present invention is to provide new and improved means for dividing an elongated mass into a plurality of separate groups, each group having a plurality of separate members, wherein the dividing means includes means for discharging one of the plurality of separate groups of separate members along a second of two discharge paths after a determination that the weight of that one of the plurality of separate groups is within a predetermined acceptable weight range.

Another object of this invention is to provide new and improved mechanism for transferring successive groups of sliced material from a platform.

Another object of the present invention is to provide new and improved mechanism of the character described comprising a platen having a plurality of fingers adapted to move upwardly through parallel slots extending inwardly from an edge of the platform and a stop member positioned above the platen to engage the uppermost of the slices to limit upward travel of the group as the group is elevated, and means for laterally moving the platen toward and away from the platform.

Another object of the present invention is to provide new and improved mechanism of the character described including means for lifting the platen from a lower to an upper level to elevate a group of slices from a platform at the beginning of a return stroke and for lowering the platen to deposit a group of slices on the upper belt runs of a belt conveyor at the end of a return stroke.

Another object of the present invention is to provide new and improved apparatus for classifying successive groups of the slices.

Another object of the present invention is to provide new and improved classifying apparatus of the character described comprising weighing means fo producing signals responsive to the weight of successive groups, a conveyor having a receiving portion and a discharging portion, the discharging portion being movable between a first and a second position, means for transferring successive groups from the weighing means to the receiving portion of the conveyor, and means for moving the discharging portion of the conveyor between the first and second positions in response to selected ones of the signals.

Another object of the present invention is to provide new and improved classifying apparatus of the character described wherein the conveyor has conveying and returning runs and comprises endless parallel bands entrained over parallel roll means at opposite ends of the runs of the conveyor and wherein the moving means axially shifts the roll means at one end of the runs in response to the aforesaid selected ones of the signals.

These and other objects, features, and advantages of the present invention will be evident from the following description, with the aid of the accompanying drawings, of a preferred embodiment of the present invention.

Briefly, in a preferred embodiment of the apparatus of the present invention there is provided an automatically controlled apparatus for producing weight controlled stacks of a selected counted number of slices cut from an elongated mass or load of food product. The apparatus includes means for feeding the loaves longitudinally in end-to-end relation along a downward feed path at a substantially constant feed rate into the cutting path of a rotary slicing knife. A stacker mechanism below the cutting path is provided for receiving and accumulating a selected number of slices into groups and then releasing or depositing the groups on a weighing system scale for measuring the weight thereof without requiring interruption of the normal feed rate of the loaves fed to the knife of the slicer. The weighing system provides a signal for initiating speed changes in an adjustable speed motor driving the rotary knife thereby to vary the thickness of slices being cut from the loaf in response to the weight of a stack or group of slices weighed. The signal from the weighing system is also provided for initiating action of a product accept-reject mechanism which delivers the stacks in succession to a discharge conveyor. The position of delivery to the conveyor is indicative of whether or not the stack is to be accepted or rejected. A high speed transfer system is provided for removing the weighed stacks of sliced product from the scale platform of the weighing system and for transferring the stacks to the product accept-reject mechanism.

For a better understanding of the present invention reference should be had to the following detailed description taken in conjunction with the drawings in which:

FIG. 1 is a side elevational view of a new and improved apparatus for producing weight controlled groups of sliced food product and the like constructed in accordance with the features of the present invention;

FIG. 2 is a top plan view of the apparatus of FIG. 1;

FIG. 3 is an isometric diagram in schematic animated form illustrating the flow path of movement of the food product as it is moved through the various components of the complete apparatus;

FIG. 4 is an enlarged top plan view looking downwardly into the upper receiving end of a feeder for directing the loaves into the slicer of the apparatus in accordance with the present invention;

FIG. 12A is a sectional view taken substantially along line 12A—12A of FIG. 11b, and FIGS. 13A, B, and C illustrate schematically an electrical control system for operating and controlling the apparatus of the present invention.

DESCRIPTION OF THE APPARATUS

Figure 5:
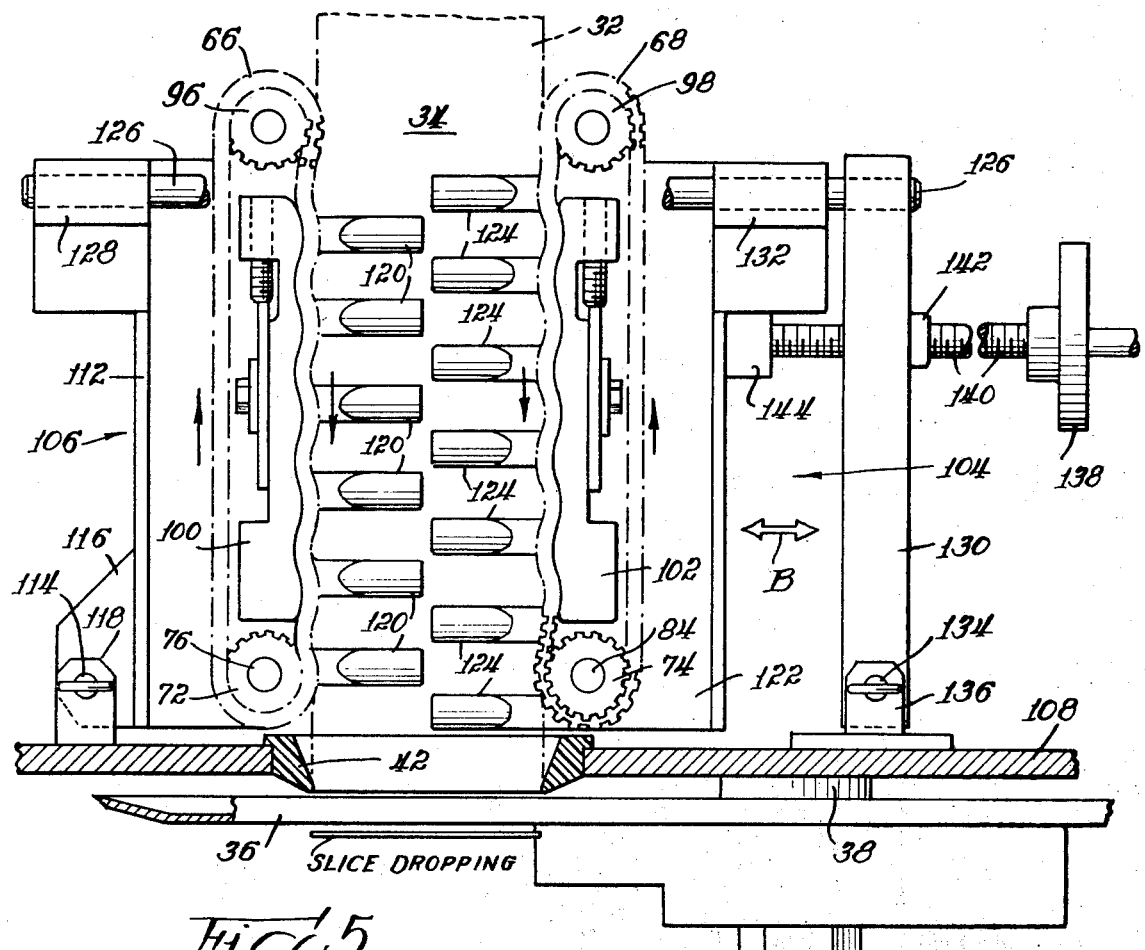
FIG. 5 is an elevational view of the feeder taken substantially along line 5—5 of FIG. 4.

Referring now more particularly to the drawings, in FIGS. 1, 2 and 3 is illustrated in general fashion a new and improved apparatus constructed in accordance with the features of the present invention for producing weight controlled stacks or groups containing a selected number of slices cut from an elongated mass or loaf of food product such as cheese, meats, cold cuts, sausage, etc. The apparatus is especially well adapted for producing discrete or separate groups or stacks of a counted number of slices of food product, each group having a measured weight equal to or exceeding a selected net weight which is printed or indicated on the package in which the stack is sold. The apparatus includes a loader 30 for receiving elongated masses or loaves 32 of food product or the like and elevating, orienting and feeding the loaves in end-to-end relation onto a downward feed path toward a feeder 34. The feeder is adapted to feed the loaves at a selected feed rate into the cutting path of a rotating knife 36 of a requirement. The knife is carried on a shaft 38 generally parallel speed the feed path of the loaves into the slicer and is driven by a variable speed motor 40 to vary the thickness of the slices to produce stacks or groups meeting a minimum weight requirement for a selected number of slices in a package. The knife motor and shaft are supported from a top wall 108 of a knife housing 110, which housing in turn is pivotally supported from a main apparatus housing 164 (FIGS. 1 and 2) on a pair of pivot pin assemblies 168. The main housing 164 is supported from a floor or other structure on legs 166.

As shown in FIG. 5, the cutting path of the rotating knife 36 beneath the top wall 108 of the knife housing is in shearing relation with the margin or lower edge of a restrictive orifice defining ring 42 positioned at the lower or discharge end of the feeder 34. The feeder 34 guides the loaves through the restricted orifice opening which compresses and holds the product as the slices are cut therefrom. As the slices are cut by the knife they fall onto a stacker or stacking mechanism 44 (FIGS. 8, 9 and 10) for accumulation and separation into groups or stacks 46, each of which contains a counted selected number of slices having a prescribed minimum weight. The stacker 44 accumulates a counted selected number of slices which are fed from the slicer at substantially constant intervals between slices and discharges or deposits the stacks onto a scale platform 220 of a weighing system 48 which includes means for rapidly weighing the stacks and determining whether or not a stack meets the minimum weight requirment. The weighing system provides a control signal for adjusting the soeed of the motor 40 and consequently the knife speed to vary the thickness of the slices cut so that subsequent stacks will closely approach a desired optimum weight value. After weighing of the stacks has been completed the stacks are removed from the scale platform by a transfer system 50 and are classified by a product accept-reject mechanism before deposit onto a discharge conveyor 52.

In accordance with the present invention the weighing system 48, in conjunction with the accept-reject system 51 of the transfer system 50, positions the stacks 46 of slices on the final discharge conveyor 52 in a manner whereby the position of the stacks indicates whether the stack is of acceptable weight or must be rejected because it is underweight or overweight. As shown in FIG. 2, one of the stacks 46 is positioned out of line with respect to the other stacks moving along the conveyor and this out of line position is an indication to an operator at a subsequent processing or machine location that the stack is a reject and should be returned for rework.

The method and apparatus 20 of the present invention is adapted to handle elongated masses or loaves 32 of meat and other food products such as cheese, etc. which is produced with a variety of different transverse cross sectional shapes and dimensions and the apparatus is adjustable by an operator to produce stacks of slices numbering in a wide range, for example from 2 to 29 slices per stack, and a wide range of stack weights, for example a range from approximately two to thirty ounces. Depending upon the density of the particular product being sliced, the number of slices in a stack to provide a given weight may vary somewhat and an operator may select both the number of slices in a stack and a minimum stack weight, as well as a tolerance range for overweight rejects to thereby minimize the amount of extra product supplied over the minimum required. A control console 39 with suitable indicators is provided for the operator for monitoring and selecting the number of slices and the weight minimum for the stacks. The elongated loaves of product to be sliced are of a substantially uniform cross-section throughout their length except possibly for the ends of the loaves which may be rounded in a sort of bullet shape.

The loaves 32 are normally brought at random time intervals by trucks or the like to the loader 30 and are unloaded to lay side by side horizontally on a table structure 54 which is positioned at a normal working or supply level. The loaves are held in readiness on the table structure and elevated one by one by an upright elevating mechanism 56 to an upper level for eventual discharge in longitudinal end-to-end relation by a lateral discharge conveyor 58. The loaves are directed laterally outwardly by the conveyor into a downwardly curving chute structure 60 which changes their direction of feed from generally horizontal toward a vertical feed path into the upper end of the feeder 34. If it is desired or necessary the bullet shaped ends 32a of the loaves may be chopped off or cropped in the loader by a pair of rotating knives 62 driven by motors 64. Details of the loader 30 are set forth in the copending U.S. patent application Ser. No. 293,145, filed Sept. 28, 1972, and assigned to the same assignee as the present application.

Figure 6:
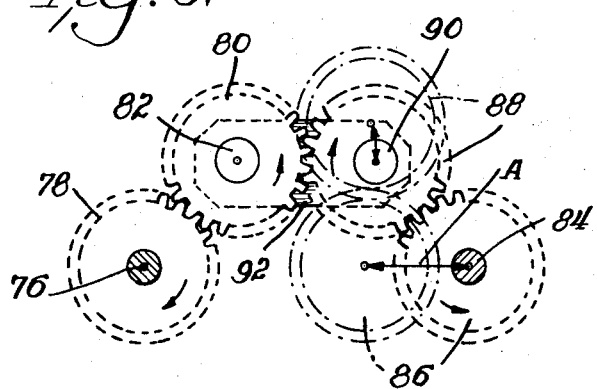
FIG. 6 is an elevational sectional view taken substantially along line 6—6 illustrating a drive train arrangement for the belts of the feeder.
Figure 7:
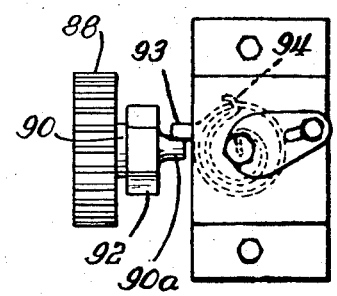
FIG. 7 is an elevational sectional view of the feeder drive train taken substantially along line 7—7 of FIG. 4.

The loaves 32 are directed by the feeder 34 into the slicer 37 along a downward feed path through the restricted orifice opening in the orifice ring 42. The feed path intersects the cutting plane of the rotating knife 36 below the top wall 108 of the knife housing. The feeder 34 includes a pair of cleated endless belts 66 and 68 driven at a selected speed by a reversible feeder-retractor motor 70. The belts 66 and 68 are cleated on both sides and are driven by a pair of lower drive rolls 72 and 74 having cleat engaging ridges and grooves thereon for positively synchronizing the feed speed of the belts to produce a substantially constant rate of feed into the cutting path. The drive roll 72 is mounted on a shaft 76 having a toothed gear 78 on one end, which gear is in driven engagement with a main drive gear 80 (FIG. 6). The drive gear 80 is carried on a shaft 82 coupled to the output shaft of the motor 70. The cleated belt 66 is movable along a fixed, downwardly extending belt run and the opposite belt 68 is adjustable laterally toward and away from the belt run to accommodate different cross-sectional shapes and sizes of loaves that are handled by the feeder. The drive roll 74 of the cleated belt 68 is mounted on a shaft 84 having a gear 86 on one end thereof and this gear is in driving engagement with an idler gear 88 mounted on an idler shaft 90. The shaft 90 is linked with the shaft 82 by a pivot link 92 and, as best shown in FIG. 6, as adjustments in the lateral spacing between the endless drive belts 66 and 68 are made, the gear 86 is moved toward and away from the gear 78 (as indicated by the arrow A) while in continuous synchronous driven engagement therewith through the main driven gear 86 and the idler gear 88. In order to insure that the idler gear 88 is continuously biased into driving engagement between the gears 80 and 86, the shaft 90 includes a flatted end portion 90a which is urged downwardly by a finger 92 biased downwardly by a coil spring 94 (FIG. 7).

The upper ends of the belts are supported by idler rolls 96 and 98 respectively and each belt has an inside, downward run opposite and facing the other for positive driving engagement on opposite sides of the loaves 32. As best shown in FIG. 5 the belt 66 is provided with a backing guide member 100 having a belt engaging surface formed with alternate ridges and grooves thereon providing an undulated guide path for the driving run of the belt. The belt 68 has a similar backing guide member 102 with an undulated guide surface and the ridges on one guide member are disposed opposite the grooves on the opposite guide so that a serpentine path is defined between the guides 100 and 102 by the driving runs of the belts 66 and 68. The serpentine path provided by the drive runs of the belts 66 and 68 provides for positive gripping and feeding of the loaves into the slicer 37 and a substantially constant downward feed rate is maintained with very little if any slippage. The belt backing guides 100 and 102 insure that each loaf passing through the feeder 34 is positively fed along a precise feed path into the cutting path of the knife 36 at a substantially constant selected feed rate.

In order to accommodate loaves 32 having various different cross sections and transverse dimensions, the belt 68 and backing structure 102 are supported on a support 104 movable toward and away from the run of the belt 66 which is relatively fixed and supported from a structure 106. Both belt support structures extend upwardly from the top wall 108 of the knife housing 110 are offset from the axis of rotation of the knife. The wall 108 is octagonal in shape as shown in FIG. 2 and normally is positioned to overly a similarly shaped opening in the top wall of the main housing 164 when the slicer is in a normal operating position. When it is desired to clean the slicer or change the knife 36, the knife housing 110 is pivoted on the pivot axles 168 to expose the underside of the wall 102 and knife 36. The support 106 for the belt 66 includes an upright guide 112 of generally Z-shaped transverse cross-section (FIG. 4) and the lower end of this structure is attached to the housing wall 108 by a pair of pivot pins 114 having pull rings in the end for extracting the pins so that the feeder 34 may be disconnected from the knife housing 110 for cleaning or maintenance if required. The pins 114 normally extend through aligned apertures in a pair of brackets 116 secured to the guide structure 112 and a pair of upstanding brackets 118 mounted on the top wall 108 of the knife housing.

As best shown in FIG. 5, the Z-shaped guide 112 is formed with a plurality of spaced apart, horizontal fingers 120 along one flange thereof, said fingers projecting outwardly of the face of the driving run of the belt 66 for engaging and laterally guiding a transverse side of a loaf 32 fed down the feed path into the orifice ring 42. The support 104 for the belt 68 includes a similar guide 122 of Z-shaped transverse cross-section (FIG. 4) and this guide has a plurality of spaced apart, horizontal fingers 124 along one flange adapted to extend into the slots and mesh between the fingers 120 of the guide 106 when the spacing interval between the belts 66 and 68 is reduced to accommodate relatively thin loaves of food product. Pairs of guide fingers 120 and 124 thus cooperate to provide a transverse guiding surface that is adjustable in width and generally transverse to paths of the driving runs of the endless belts 66 and 68.

The guide structure 122, endless belt 68 and backing member 102 are supported for movement toward and away from the belt 66 from a pair of parallel horizontal rods 126 disposed outwardly of opposite edges of the belts 66 and 68. The support rods extend between sleeves 128 mounted adjacent the upper end of the upright 112 and mounting apertures provided in the upper end of an upright support 130 spaced outwardly of the belt 68. The drive shafts 76 and 84 for the drive rolls 72 and 74 and the shafts for the upper idler rolls 96 and 98 of the belts 66 and 68, are mounted and supported on bearings (not shown in detail) carried on the finger flanges of the respective upright guides 112 and 122. The guide 122 is provided with a pair of support sleeves 132 similar to the sleeves 128 and in sliding engagement on the support rods 126 so that the belt 68 may be adjusted in the direction of the arrows B in FIGS. 4 and 5 toward and away from the belt 66. The upright support 130 is detachably connected to the top wall 108 of the knife housing 110 by means of a pair of removable pins 134 having pull rings at one end and the pins are adapted to project through aligned openings in the lower part of the upright support 130 and a pair of upstanding lugs 136 secured to the knife housing top wall 108 (FIG. 5). By removing both sets of pins 114 and 134, the entire feeder 34 can be dismounted from the knife housing 110 of the slicer 37 and if only the pins 134 are removed, the structure of the feeder can be pivoted in a counterclockwise direction (FIG. 5) about the axis pins 114 to expose the lower or discharge end of the feeder and expose the removable orifice ring 42.

Orifice rings having various different shapes and sizes of restricted orifices are insertable in an opening in the housing top wall 108 offset outwardly of the axis of the drive shaft 38 of the knife as best shown in FIG. 5. Each time that loaves of a different cross-section are sliced, an appropriately shaped orifice ring is inserted and locked in place in the opening in the knife housing top wall 108.

Adjustment of the position of the endless belt 68 toward or away from the belt 66 in the directions indicated by the arrows B to accommodate different types of product is set and controlled by a hand wheel 128 mounted on the end of a threaded shaft 140. The shaft, which extends through an internally threaded collar 142 provided on the upright, 130, is coupled at its inner end to the back side of the guide member 122 via a coupling 144. Turning of the hand wheel 138 positively adjusts and holds spacing between the belts 66 and 68 providing a serpentine path of selected width for the loaves 32 fed into the cutting path of the knife 36.

Referring to FIG. 4, the feeder 34 is provided with an elongated upright guide bar 146 spaced opposite the cooperating guide fingers 120 and 124 and adjustably positioned to move toward and away from the guide fingers as well as toward and away from the faces of the belts 66 and 68 as indicated in the dotted lines of FIG. 4. The guide bar 146 is provided with a pair of support pins 148 extending outwardly and slidably mounted in openings provided in a separate upright member 150. The upright 150 in turn is slidably supported on a pair of rods 152 extending outwardly from a relatively fixed member 154. A hand wheel 156 on the outer end of a threaded adjustment rod 158 is provided for adjusting (in the direction of the arrows C) and setting the position of the guide bar 146 (FIG. 4) relative to the opposite guide fingers 120 and 124. The inner end of the adjustment rod 158 is rotatively coupled to the guide bar and the rod extends through an internally threaded collar attached to the member 150 to provide in and out position adjustment of the guide bar relative to the support member 150. The support 150 is slidable on the rods 152 and is movable in the direction of the arrows D. Clamping means is provided for securing the member 150 in a selected position on the rods 152 after an adjustment is made and a position is selected.

The elongated loaves 32 of food product are positively fed at a selected substantially constant rate along the feed path by the driving engagement of the driving runs of the cleated feed belts 66 and 68 and the product is compressed and bent in reverse direction as it moves down the serpentine path defined by the belts and their backing members 102. Each loaf is positively gripped by the belts and fed into the path of the cutting knife 36 so that little if any slippage occurs. The loaves are retained between the feed belts by the cooperating guide fingers 120 and 124 on one side and the adjustable guide bar 146 on the opposite side.

In accordance with the present invention, in order to hold and precisely guide the product loaves 32 into cutting engagement with the rotating knife 36, the insertable orifice rings 42 are seated in the opening provided in the top wall 108 of the knife housing. For each different cross-sectional shape or size of loaf being slices, an appropriate orifice ring 42 is provided. The rings are dimensioned so that the dimension at the lower edge or margin of the orifice opening is slightly smaller than the normal uncompressed cross-section of the product loaf being sliced. The loaves, being substantially uniform in cross-section, are compressed inwardly towards the longitudinal axis thereof by engagement with the walls of the orifice ring 42. The loaves are also compressed in a longitudinal direction when forced through the orifice ring because the walls of the orifice opening are convergently tapered. The orifice ring and its compression effect on the loaf supports the end portion and permits a loaf to be sliced down to its end after it is no longer in engagement with the belts of the feeder.

Figure 8:
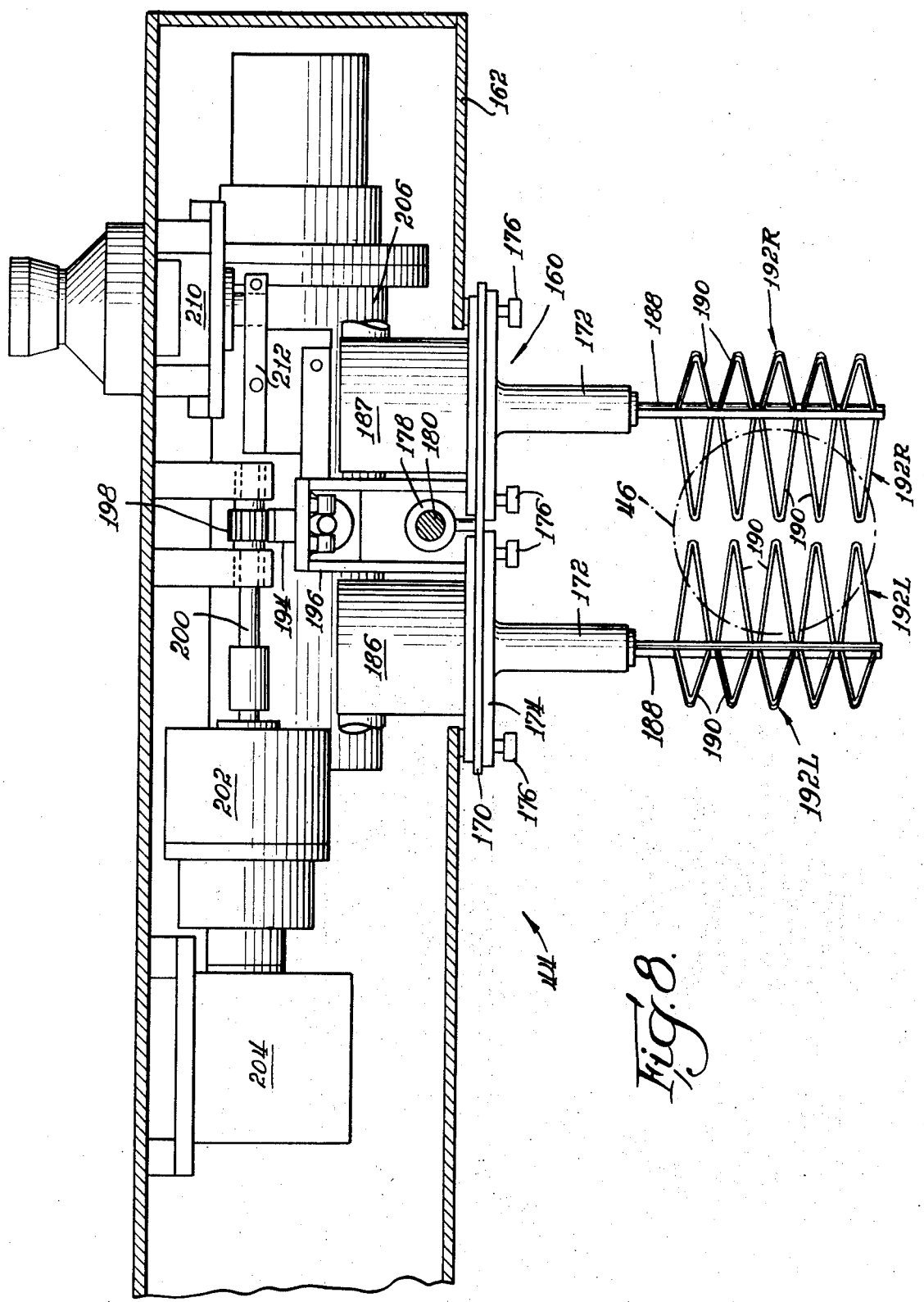
FIG. 8 is a horizontal sectional view illustrating a stacker of the apparatus in accordance with the features of the present invention.
Figure 9:
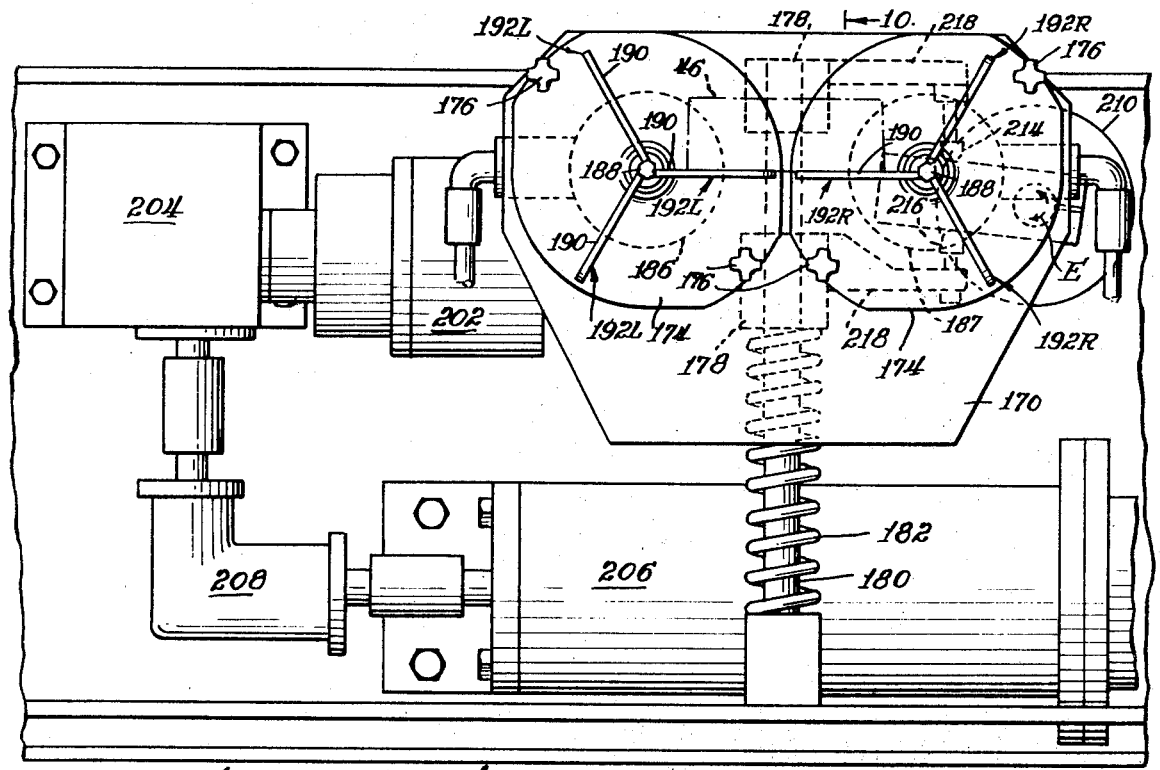
FIG. 9 is a front elevational view of the stacker.
Figure 10:
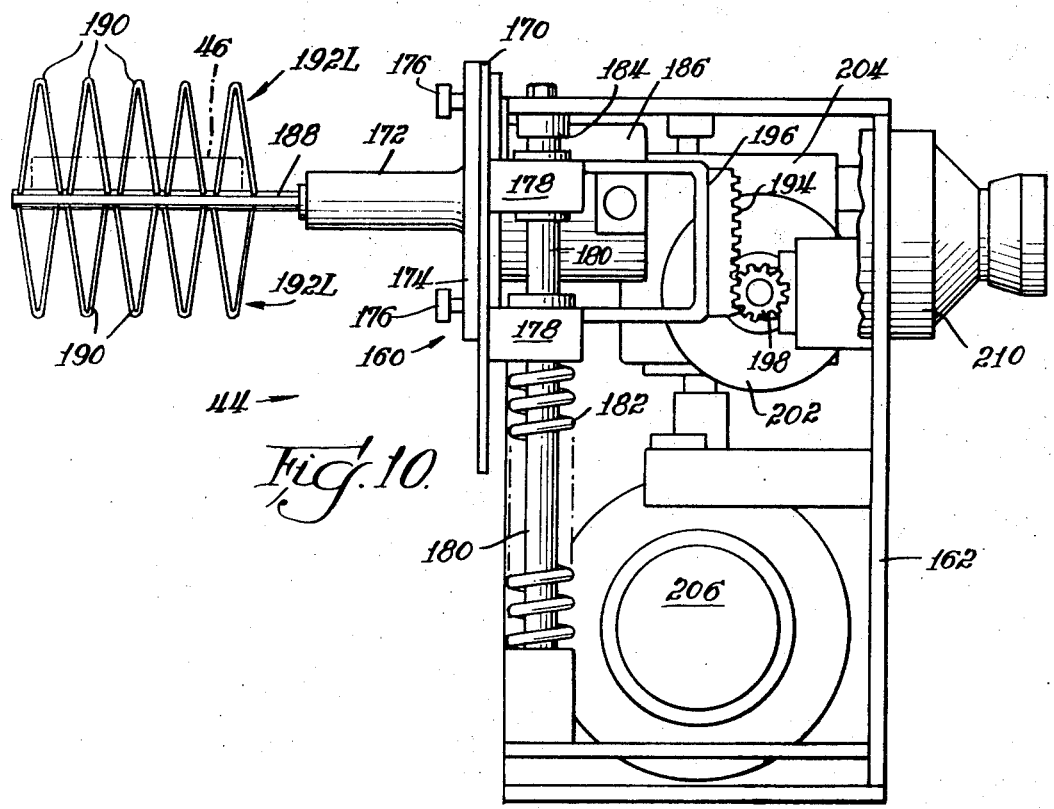
FIG. 10 is a transverse sectional elevational view taken substantially along line 10—10 of FIG. 9.

As shown in FIG. 5, the margin or lower edge of the orifice ring 42 is secured in shear cutting relation with the cutting path defined by the cutting edge of the rotating knife 36 so that precise and rapid slicing of the positively held food product loaves 32 is achieved. As slices from the loaf 32 are cut by the high speed rotary knife 36, the individual slices fall downwardly from the cutting path for grouping into stacks having a selected number of slices therein by the stacker 44 (FIGS. 8, 9 and 10). The slices are cut from the loaves 32 on an uninterrupted basis as the loaves are moved downwardly into the slicer 37 at a constant rate by the feeder 34 through the orifice ring 42. It is a feature of the present invention that no interruption in feeding of the loaves is required because the stacker 44 is operable to rapidly handle and separate accumulated slices into stacks having the selected number of slices therein. In addition, the stacker 44 provides for a substantially constant distance of fall for each slice as it leaves the cutting plane to a level whereat the slice is supported either by a preceding slice as the stack is accumulating or by a support platen. A substantially constant distance of fall from the cutting path to a support level for each slice being cut is accomplished by providing a vertically reciprocating carriage 160 movable from an upper or starting level on a downward stroke at substantially the same speed as the loaves 32 are fed downwardly by the feeder 34 into the cutting path of the knife 36. As a stack is collected and the height or thickness of the stack increases, the downward travel of the carriage 160 compensates to provide essentially a constant support level for each successive slice falling from the cutting path. The stacker 44 of the present invention is operable at very high speeds so that production rates as high as 160 stacks per minute or greater are achieved. The stacker includes a rectangular enclosure or housing 162 mounted beneath the knife housing 110 and within the main housing or enclosure 164 of the apparatus.

The carriage 160 comprises a vertical front plate supporting a pair of horizontal shaft housings 172 which project outwardly thereof and are detachably mounted on the front plate. The housings include circular base flanges 174 removably attached to the carriage plate by large headed fasteners 176. The shaft housings 172 are aligned in horizontal parallel relation and are spaced on opposite sides of a vertical centerline through the front plate 170 aligned below the downward feed path of loaves moving through the feeder 34 and the slices cut from the loaves by the rotating knife 36. As best shown in FIG. 10, the front plate of the stacker carriage is provided with a pair of rearwardly extending lugs 178 having vertical apertures therein and slidably disposed on an upright guide rod 180 for guiding the travel of the carriage in repetitive cycles comprising downward and return strokes. The carriage is biased upwardly to an upper starting level by a coil spring 182 disposed on the rod and a cushion 184 is provided adjacent the upper end of the rod to aid in cushioning the carriage at the end of an upward return stroke. A pair of incremental stepping motors 186 and 187 are mounted on the back of the carriage plate 170 and the axes of the motors are in coaxial alignment with the left and right hand shaft housings 172. The stepping motors are adapted to drive and are detachably coupled to a pair of outwardly extending platen control shafts 188 with each shaft supporting three rows of outwardly extending hair pin shaped fingers 190 arranged in planes spaced at angles 120° apart around the axes of the shafts as viewed in FIG. 9. The sets of fingers 190 in each plane on the left hand shaft 188 comprises a paddle-like platen 192 and similarly for the right shaft, platens 192R are formed. Successive pairs of horizontally aligned intermeshing platens 192L and 192R provide support for accumulating successive stacks of sliced product cut from the loaves 32 by the knife 36 in the cutting path above. As best shown in FIG. 9 the left and right shafts 188 are indexed by stepping motors in increments of 120° in opposite directions so that the pairs of platens 192L and 192R cooperate to discharge an accumulated stack downwardly toward the weighing system and the next pair of platens 192L and 192R then form a horizontal support for accumulating the next successive stack of slices 46 thereon.

As additional slices are cut and added to a stack formed on the platens, the carriage 160 is traveling downwardly at a rate substantially the same as the rate of feed of the loaves 32 into the cutting path of the knife 36. Accordingly, a substantially constant distance of fall from the cutting path to a support level is provided by the stacker 44 for the successive slices in a stack. As the last slices in the stack are being added the carriage 160 is approaching the lowestmost position, and the stepping motors 186 and 187 are energized by controlled pulses to rotatively index the shafts 188 by 120° in opposite directions as shown in FIG. 9 to discharge or release the accumulated stack of meat slices and form the next support means with a successive set of cooperative platens 192L and 192R moving into the horizontal position ready to accumulate the slices of the succeeding stack. Indexing of the shafts 188 by the stepping motors 186 and 187 is rapid so that the already accumulated stack of slices is released and the next set of platens 192L and 192R move into horizontal position with no interruption of the normal feed rate of the load into the slicer. Indexing of the platens occurs during the time that the carriage 160 is moving upwardly on its return stroke by the spring 182 so that, as the first slice arrives for the next successive stack, a substantially constant dropping is maintained. As each successive slice is accumulated in a stack, the carriage 160 has moved downwardly by an increment substantially equal to the thickness of the slice.

Travel of the carriage 160 on a downward stroke while accumulating the sliced meat product is accomplished by means of a vertical, toothed rack 194 secured to the back of the carriage platen 170 on a supporting structure 196. The rack is in meshing engagement with a pinion 198 mounted on a pinion shaft 200 which is coupled to the output shaft of an electromagnetic particle clutch 202. An input shaft of the clutch 202 is coupled to a gear reducer 204 which in turn is coupled to the output shaft of a continuously rotating stacker drive motor 206 through a right angle gear box 208 as best shown in FIG. 9. The stacker drive motor, the speed of which is infinitely variable over a range to enable the rate of downward movement of the carriage 160 substantially to equal the rate at which the load being sliced is fed to the slicer, is continuously energized and running when the apparatus 20 is in operation and the clutch 202 is intermittently supplied with power for precise intervals of time to rotate the pinion 198 in a counter-clockwise direction (arrow P FIG. 10) for driving the carriage on a downward stroke at a selected rate speed. When the carriage approaches the end of the downward stroke the holding current to the clutch 202 is discontinued to release the clutch 202 and the return spring 182 acts to return the carriage upwardly to an initial upper starting level.

In order to dampen oscillations of the carriage 160 at the end of the reciprocal strokes as the direction of movement is reversed, a dashpot assembly 210 is provided on the rear wall of the housing 162. The dashpot may be of a rotary type having a forwardly extending shaft 211 with a radial arm 212 secured thereto. The dashpot arm is engageable between upper and lower threaded adjustable stops 214 and 216 (FIG. 9), which stops are carried on upper and lower brackets or arms 218 and 219 connected to the carriage plate 170. As the carriage 160 reciprocates back and forth, the adjustable stops 214 and 216 engage opposite sides of the arm 212 on the dashpot shaft and oscillate the shaft back and forth, as indicated by the arrow E. The dashpot 210 resists oscillatory rotation and thus dampens vibrations of the fast moving carriage 160 as it reverses direction.

In accordance with the present invention, successively accumulated stacks 46 of sliced product cut by the knife 36 are discharged from the pairs of cooperating support platens 192L and 192R upon indexing of the shafts 188 by the stepping motors 186 and 187. The discharged stacks 46 fall downwardly onto a scale platform 220 (FIG. 11a) comprising a plurality of spaced apart vertical fingers 222 which are interconnecting at one side and are separated by slots open on the opposite side. The platform 220 is mounted on a support rod which extends downwardly and is connected to move a magnetic core of a weight cell 228. As discussed in further detail hereinafter, the weight cell 228 may comprise a transformer adapted to provide an electrical signal which is responsive to the weight of the stack of slices on the scale platform. Alternatively, the cell may be arranged to provide a signal representing the difference between the stack of slices being weighed and a selected reference or tare weight. The weighing system or mechanism 48 thus provides control signals which are used both for changing the speed of the slicer motor 40 and for activating a product accept-reject mechanism 51 to indicate by placement of the weighed stacks of slices 46 on the discharge conveyor 52 whether the stacks are within an acceptable weight range. As successive stacks 46 of the sliced product are deposited on the scale platform 220, a repetitive weight measuring cycle is initiated wherein the platform is allowed a period of time to settle so that vibrations from the impact of the falling stack are damped. Following this interval a weight measurement is taken and a signal in response to the measurement is produced. A short interval follows wherein a decision is made to cause the product accept-reject mechanism 51 to accept or reject the stack and to change the rotative speed of the slicer knife 36 if required.

Figure 11:
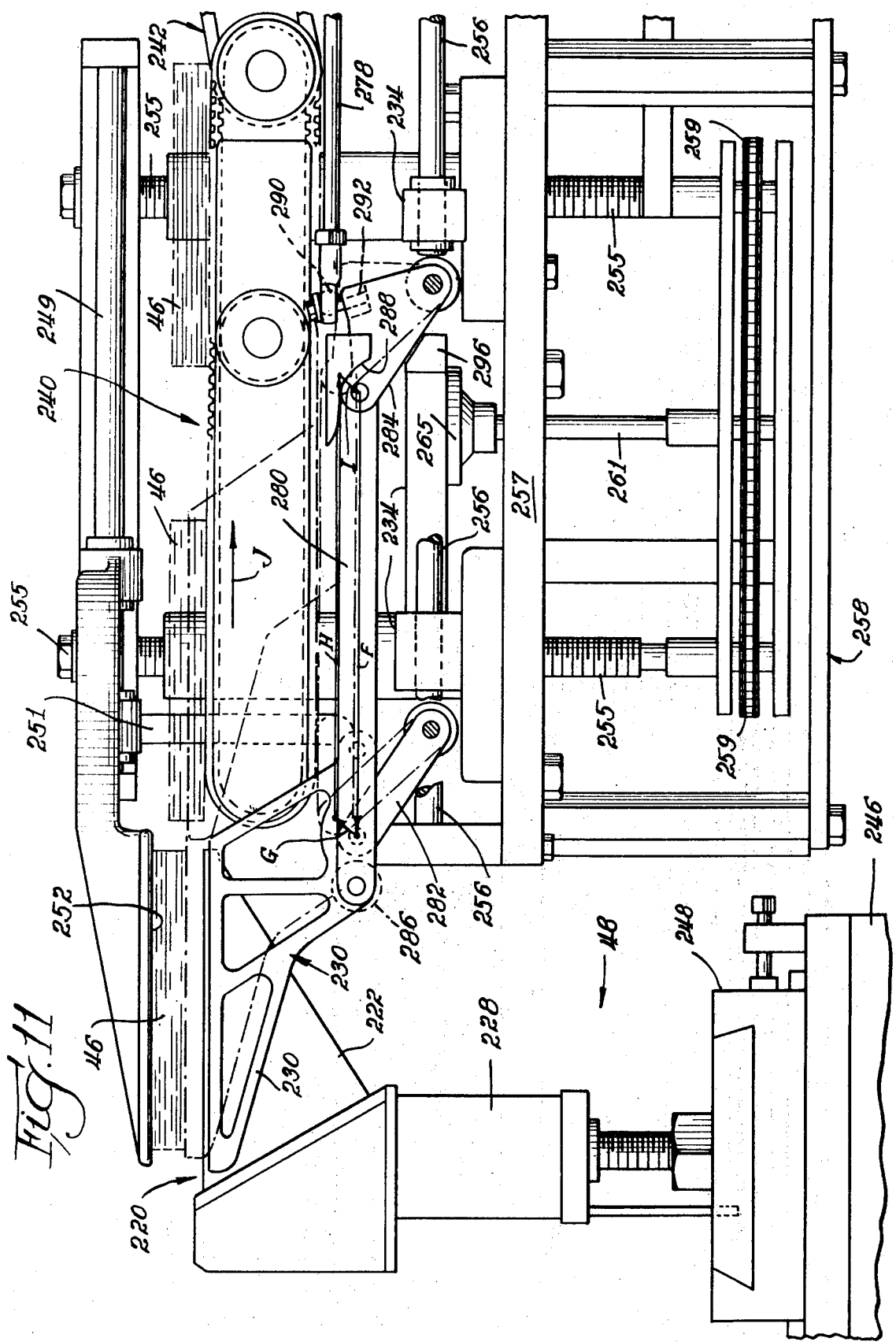
FIGS. 11a and 11b are a side elevational view of a weighing sytem and transfer system of the apparatus in accordance with the present invention.
Figure 13C:
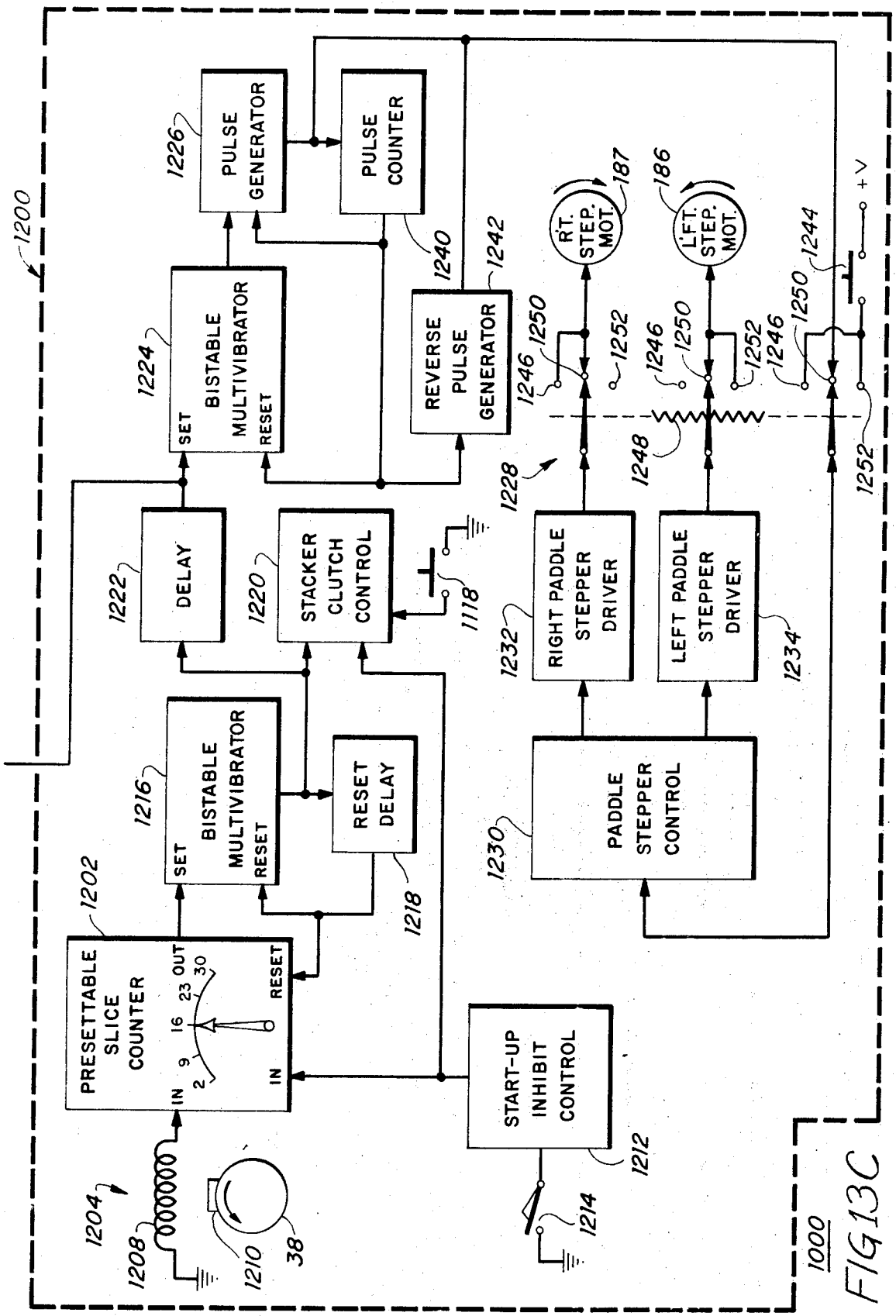

Before the arrival of the next stack of sliced product, the weighed stack is removed from the scale platform 220 by the transfer system or mechanism 50 which includes a transfer platen 230 movable horizontally and vertically and comprising a plurality of horizontally spaced apart vertical fingers 232 which are adapted to move in and out and up and down without interference within the open spaces or slots 224 between the fingers 222 on the scale platform. As best shown in FIG. 11a, while the stack of sliced product is being weighed, it is resting on the upper edges of the scale platform fingers 222 and the fingers 232 of the transfer platen are positioned with their upper edges at a level below the scale platform so as not to interfere with the weighing process before the stack is picked up by the transfer mechanism. After the weighing cycle is completed, the transfer platen 230 moves upwardly to elevate the stack of weighed slices 46 above the scale platform 220 and then moves laterally on a retracting stroke away from the scale (left to right in FIGS. 11a and 11b), to make room for the next stack of slices to be deposited on the scale platform. The transfer platen is supported from a reciprocally movable transfer carriage 234 which is activated to move on advancing and retracting strokes by means of a carriage control cylinder 236 controlled by a solenoid actuated valve 238 (FIGS. 13 A, B, C). As indicated diagrammatically on FIG. 11a the transfer platen 230 moves from a right hand starting or release position along a lower level (arrow F) on an advancing stroke after a new stack of sliced product has been deposited on the scale platform 220 for weighing. After reaching a left hand or pickup position at the lower level and when the weighing cycle is complete, the transfer platen 230 moves upwardly (arrow G) to lift the stack of slices from the scale platform. The platen continues on a retrack stroke (arrow H) from the lifting or pickup position toward the right along an upper level. After the elevated stack of slices clears the right hand edge of the scale platform, the transfer platen 230 is urged downwardly from the upper level on a release or deposit stroke and the stack 46 of slices is deposited onto the upper belt runs of the transfer conveyor 240. The transfer conveyor 240 moves the weighed stacks 46 onto an upwardly sloped product accept-reject conveyor 242 of the accept-reject mechanism 51 and ultimately the weighed stacks of slices are deposited onto the discharge conveyor 52 in a position which indicates whether or not the particular stack meets the acceptable minimum weight requirement and is within an acceptable weight range. Mechanical means may be provided for removing the rejected stacks for further rework or processing while the acceptable stacks moving along the conveyor 52 are ready for further processing or packaging for market.

The weighing system 48 includes a large, heavy, base structure 246 (FIG. 1) supported independently of the main housing 164 and other components so that the weight cell 228 will be mounted on a stable solid base isolated from the vibrations of other portions of surrounding mechanism. An adjustable base assembly 248 is provided for precisely positioning the scale platform 220 and the associated weight cell 228 in order that the stacks 46 discharged from the stacker platens 192L and 192R will center on the scale. A threaded adjustable support post 250 is provided to adjust the vertical level of the upper surface of the scale platform 220 so that only a small amount of upward travel of the transfer platen 230 is required to lift or elevate a stack 46 (arrow G) from the scale platform for lateral transfer to the conveyor 240. Moreover, if the stack weight is changed the weight cell 228 may be provided with a different tare weight and the adjustment post compensates to maintain a constant level of the scale platform relative to the transfer platen.

As the fingers 323 of the transfer platen 230 move upwardly to elevate a stack of slices from the scale platform 220, the stack may tend to jump upwardly and a stop member 252 is provided to limit upward travel of the stack during the pickup stroke. The upper stop is interconnected to reciprocating carriage 234 by suitable interconnecting structure indicated by the reference number 251. The carriage 234 for supporting the transfer platen 230 is mounted on a pair of horizontal guide rods 256 supported at opposite ends from a main base or frame structure 258 of the transfer mechanism 50. The carriage 234 includes a plurality of sleeves slidable on the support rods 256 so that the carriage can move back and forth between the left hand pickup position and the right hand release position. As a stack 46 of weighed slices is lifted from the scale platform 220 by the transfer platen 230 and is moved on a retract stroke toward the right, a minimum spacing is provided between the stop member 252 and the upper surfaces of the fingers 232 of the transfer platen. The stack is held against the stop member by upward pressure from the platen 230 and the stack itself limits the upward movement of the platen during the pickup and retraction strokes.

The stop 252 is adjustable vertically with respect to the upper level travelled by the transfer platen 230 in order to accommodate stacks 46 of different height or thickness. The stop is slidably supported on a rod 249 and reciprocates thereon in a horizontal direction in unison with the carriage 234. The stop support rod 249 is mounted on a vertical adjustable frame 253 supported on a pair of threaded posts 255. The posts extend upwardly and downwardly from a base plate 257 of the frame 258 in bosses 259 having threaded vertical apertures for the posts.

Rotation of the posts 255 in unison to maintain a level attitude of the stop 252 during vertical adjustment is achieved by two sprockets 259 on the lower end of the posts and another sprocket on a hand wheel shaft 261. The three sprockets are drivingly interconnected by a chain 263 so that rotation of a hand wheel 265 drives the post up or down to adjust the height of the stop 252 for a particular height of stack being handled.

Figure 12:
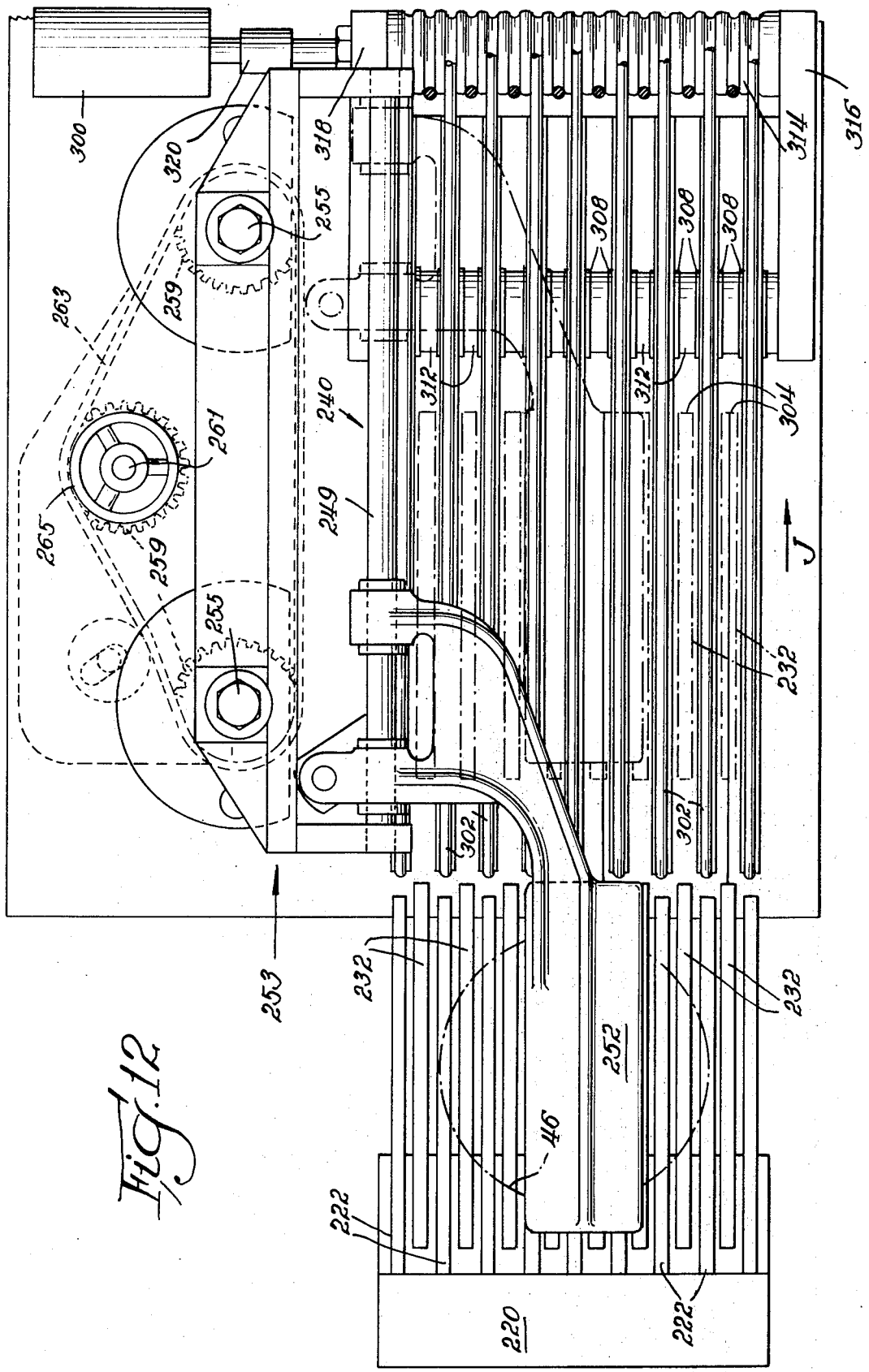
FIGS. 12a and 12b are a top plan view of the weighing and transfer systems showing a product accept-reject mechanism of the apparatus in accordance with the present invention.

The carriage control cylinder 236 includes a piston rod 260 connected at its outer end to an elongated drive member 262 having a toothed rack member 264 attached to an intermediate section of the member for reciprocal movement between a pair of support bearings 266. The teeth of the rack 264 are meshingly engaged with a pinion 268 mounted adjacent the lower end of a vertical oscillating shaft 270 supported in an upstanding bearing assembly 272. As the piston rod 260 is advanced and retracted, the rack 264 causes the pinion shaft 270 to rotatively oscillate back and forth about its vertical axis and a radial arm 274 secured to the upper end of the pinion shaft 270 swings through an arc of approximately 180° between a forward direction (left hand position FIG. 11a) extending toward the scale platform 220 and an opposite (right hand) retracted position (not shown) extending away from the scale platform. In order to dampen oscillations of the arm 274 at the end of its arcuate swings, a dampener rod assembly 275 (FIGS. 12a and 12b) is pivotally connected to the arm intermediate its length. The opposite end of the dampener rod assembly is connected to a fixed pivot axle 277 spaced eccentric in relation to the pivot axis of the arm 274. The dampener rod assembly includes a rod slidable in a sleeve having a compressing spring in one end biasing the rod outwardly as shown in FIG. 12A. The arm 274 is pivotally connected adjacent the outer end through a connector pin assembly 276 to one end of an elongated actuating rod 278 for driving the transfer platen. The transfer platen is attached to the forward end of a pair of parallel, generally horizontal side frames 280. The side frames are interconnected with the carriage 234 at their left and right hand ends through pairs of short links 282 and 284 pivotally attached to the respective left and right ends of the carriage. The carriage 234, the side frames 280, and the link members 282 and 284 form a parallelogram type interconnecting linkage between the transfer platen 230 and its supporting reciprocating carriage 234. As shown diagramatically by the parallelogram formed by the arrows F, G, H, and I in FIG. 11a, the transfer platen 230 moves horizontally at a lower level from a right hand rest position on an advancing stroke to a left hand pause position beneath the scale platform 220 ready for pickup. The transfer platen momentarily pauses as the weighing cycle is completed and then moves upwardly on a pickup stroke (arrow G) curving toward the right until upper travel is stopped by the compression of the stack 46 against the stop 252. The platen continues along an upper horizontal path on a retract stroke from left to right (arrow H) and, during this stroke, the pivot links 282 and 284 slope upwardly at a maximum angle as indicated by the dotted lines. At the end of the retraction stroke, the platen is forced downwardly by engagement of a cam roller 286 mounted on one side frame 280 with a cam 288 having a downwardly and rearwardly curved cam surface. The cam 288 is supported from the base structure 258 of the transfer mechanism 50 and engagement between the cam roller. The cam surface biases the side members 280, which support the platen 230, downwardly on a discharge or deposit stroke indicated by the arrow I. As the platen 230 is cammed downwardly, the stack 46 of sliced product carried thereby is deposited on the upper run of the transfer conveyor 240 which is moving left to right (FIG. 11a). As the platen 230 moves downwardly on the deposit or discharge stroke, the links 282 and 284 pivot in a counterclockwise direction about the lower pivot axes until the upper surface of the transfer platen 230 is below the upper level of the upper belt run of the conveyor 240. The stack 46 is then moved to the right by the belt conveyor as indicated by the arrow J.

The left hand end of the actuating rod 278 is pivotally connected via a spherical ball joint connector 290 to a cross member 292 (dotted lines FIG. 11a) which transversely interconnects the right hand pivot links 284 between the transfer platen 230 and the carriage 234. With the platen 230 at the right hand position at its lower level, an advance stroke of the carriage control cylinder 236 causes the arm 274 to swing through 180° in a clockwise direction toward the position shown and this causes the connector rod 278 to advance from right to left pushing the side frames 280 in the same direction. Because the level of push is above the level of the carriage 234, on an advancing stroke the platen 230 and carriage 234 move in unison together. Because of the rotary movement of the arm 274, the platen 230 accelerates slowly to a maximum value at the middle of the advancing stroke and then decelerates at a decreasing rate as it approaches the left hand position awaiting pickup of a weighed stack of slices 46 from the scale platform. The flow of fluid into the carriage control cylinder 236 is then reversed by the carriage control solenoid valve 238 to retract the rod 260 and the arm 274 is pivoted in a counterclockwise direction causing the drive 278 to be retracted toward the right. As this occurs, because the pull is exerted at a level above the carriage 234 which has greater inertia and tends to remain in its stationary position, the side frames 280 and platen 230 begin to move to the right before the carriage follows. As this occurs, the connecting links 282 and 284 pivot to an increased slope in a clockwise direction and the platen 230 moves upwardly on its pickup stroke until the stack of sliced product is in compression against the stop 252. Compression of the stacks 46 limits the upward extent of angular pivotal movement between the links 282 and 284 and the side frame 280 and the upper level of the platen 230. The carriage 234 then begins to follow the side frames on the retract stroke as and near the end of the stroke the engagement of the cam roller 286 engages the curved surface of the cam 288 and moves the platen downwardly to deposit the stack 46 on the upper run of the transfer conveyor 240. A stop member 296 is provided to limit the vertical minimum spacing between the side frame 280 and the carriage 234. The parallelogram linkage described thus provides for adjustable vertical spacing between the transfer platen 230 and the carriage 234 and for horizontal adjustment between the platen and carriage.

Referring specifically to FIGS. 11a, 11b, 12a and 12b of the drawings, the transfer conveyor 240 includes a plurality of endless belts 302 aligned in spaced apart parallel vertical planes aligned and centered with respect to the fingers 222 on the scale platform 220. The fingers 232 of the transfer platen 230 thus are clear to move back and forth freely between the slots in the scale platform and open spaces or slots 304 between left hand segments of the belts 302. At the left hand end, (FIG. 11a) each belt is supported on an idler pulley mounted for rotation at the outer end of a thin finger-like support blade 306. Intermediate the opposite ends of the belts there is provided a plurality of idler pulleys 308 mounted on a shaft 310 and separated by spools or disc-like spacers 312 which provide parallel spacing between the individual belts as indicated in the plan view of FIG. 12. At the right hand end of the belts 302 there is provided a drive roll 314 secured to a drive axle 316 and provided with a plurality of belt grooves in its periphery, alternate ones of which receive the endless belts 302 in driving engagement therewith. The driven shaft is supported by bearings 318 and is connected to a product discharge conveyor motor 300 with a drive coupling 320.

In accordance with the invention, the other grooves provided in the drive roll 314 between the grooves for the belts 302 are used for engagement by a plurality of endless belts 322 of the product accept-reject conveyor 242 of the mechanism 51. As shown in FIG. 11a, the upper belt runs of the endless belts 322 move toward the right (indicated by the arrow K) and are inclined upwardly to carry the stacks 46 to a level high enough for discharge onto the product discharge conveyor 52. The belts 322 may be formed of a stretchable elastic material such as rubber or the like and may be of an O-ring type conventionally used in the construction of belt conveyors. The product accept-reject conveyor 242 is adapted to have its discharge or output end shifted laterally, with a resultant stretching or contracting of the belts 322, thereby indicating by the position of the product stacks 46 deposited on the discharge conveyor 52 whether or not a particular stack meets the desired weight range criteria. As illustrated in FIG. 12b, acceptable stacks 46 are deposited and aligned toward one side of the conveyor 52 while the rejected stacks are displaced laterally.

The discharge end of the accept-reject conveyor 242 is provided with a grooved idler roll 324 mounted on an axially shiftable shaft 326 supported between a pair of bearing assemblies 328. As shown in FIG. 12b, the shaft 326 is biased by a coil spring 330 towards a reject alignment and as indicated by the dotted lines the runs of the belts 322 may be shifted angularly to change point of discharge into line with the opposite side of the conveyor 52. The other end of the shaft 326 is rotatively connected to the armature 332 of the product accept-reject solenoid via a coupling 334.

As will be described hereinafter, when an appropriate signal produced in the weighing system 48 indicates that the stacked weighed on the scale platform 220 is acceptable after a time delay, the solenoid 244 is energized to pull the armature 332 inwardly thereby shifting the shaft out of the spring biased reject position to discharge the product in the position indicating acceptance. In the event that any weighed stacks 46 do not meet the minimum weight requirement or do not fall within a desired weight range, or if an equipment failure occurs such that the solenoid 244 is not energized, the stacks are discharged as rejects.

CONTROL CIRCUIT

A preferred embodiment of an electrical control circuit for the processing apparatus is illustrated in FIGS. 13A, B and C and is generally designated 1000. The control circuit 1000 automatically coordinates and monitors the feeding, slicing, stacking, weighing, transferring and conveying functions of the apparatus. In accordance with an important advantage of the present invention, the control circuit 1000 monitors the weights of each stack of meat slices 46 to determine whether the weight of each stack 46 falls within a predetermined weight range. If the weight of a stack 46 is determined to be outside of the predetermined weight range, the control circuit 1000 correspondingly adjusts the speed of the slicing knife 36 to cause subsequent stacks 46 to eventually come within the predetermined weight range.

For purposes of clarity and simplicity, the various direct current and alternating current power supplies utilized in the control circuit 1000 are not shown. The start and stop switching controls for the various major components of the machine and of the control circuit 1000 are illustrated simply as switching controls 1100.

The controls 1100 preferably include a main power control switch 1102 for energizing the required alternating current and direct current power supplies for the control circuit 1000 and several of the motors of the machine, for example, the loader lateral conveyor motor 59, the loader elevator motor 57 and the product discharge conveyor motor 300. A stacker control switch 1104 controls the energization and deenergization of a stacker motor 206 that is used to drive the movable stacker carriage 160 downward against the force of the stacker return spring 182.

A slicer control switch 1108 is used to energize or deenergize the slicer motor 40 that is used to provide power to the slicing mechanism 36. A feeder-retractor control switch 1112 controls the feeder-retractor motor 70. The feeder-retractor motor 70 feeds an elongated mass of a food product 32 into the orifice 42 for slicing by the slicing knife 36 or retracts the elongated mass 32 from the orifice 42 to prevent further slicing by the slicing knife 36.

A weight control switch 1116 provides the required alternating and direct current power to the slicer motor speed adjustment components of the electrical control circuit 1000. A stacker clutch cut-off control switch 1118 is used to manually engage a stacker motor clutch 202. When the stacker motor clutch 202 is energized, the movable carriage 160 of the stacking mechanism 44 is driven downwardly against the force of the return spring 182 by the stacker motor 206. When the stacker motor clutch 202 is deenergized, the carriage 160 is returned to its uppermost position or held in place at its uppermost position by the force of the return spring 182.

After the control circuit 1000 is energized by the controls 1100, the desired number of slices per stack 46 and the desired weight per stack 46 are entered into the control circuit 1000. The control circuit 1000 then automatically slices, stacks, weighs and accepts or rejects the elongated mass of the food products 32 in accordance with the desired number of slices per stack 46 and the desired stack weight. Additionally, the upper and lower limits of the desired stack weight range and a maximum underweight error limit may be entered at this time into the control circuit 1000, as more fully discussed hereinafter.

A suitable circuit for monitoring the number of slices sliced by the slicing knife 36 and for discharging or dumping a stack of slices 46 after the predetermined number of slices have been accumulated is generally designated as 1200. The circuit 1200 includes a presettable slice counter 1202 that is preset to the desired number of slices per stack of the food product, which may vary from 2 to 30 slices or more per stack. The counter 1202 counts down in response to pulses from a transducer 1204. The transducer 1204 converts the rotary motion of the slicing mechanism shaft 38 into electrical input signals to the counter 1202. The transducer 1204 includes a pick-up coil 1208 for receiving pulses induced by the passage of a permanent magnet 1210 thereby. The permanent magnet 1210 preferably induces one pulse in the coil 1208 for each revoluation of the shaft 38. Since for each revolution of the shaft 38, a slice is cut from the elongated mass of a food product 32, the input pulses from the transducer 1204 to the counter 1202 correspond to the number of slices cut by the slicing knife 36. Many other suitable signaling devices could be used in place of the pick-up coil 1208, one example of which is a reed switch.

The counter 1202 counts down in response to input pulses from the transducer 1204 until the number of input pulses from the transducer 1204 equals the preset number of slices. The counting down of the counter 1202 may be inhibited during the initial start-up period of the processing apparatus by a start-up inhibit control 1212. The inhibit control 1212 provides an input signal to the counter 1202 to prevent the counter 1202 from counting down until that input signal is removed. The input signal from the inhibit control 1212 to the counter 1202 is removed in response to the detection of a mass of a food product 32 in the path of the slicing knife 36 as sensed by a suitably disposed limit switch 1214. The closure of the limit switch 1214 deactivates the inhibit control 1212 to remove the inhibit input signal from the counter 1202.

Alternately, a photoelectric cell could be used in place of the limit switch 1214. In a further alternate embodiment, the inhibit control 1212 may be disgarded and the counter 1202 permitted to count down beginning with the energization of the slicer motor 40 and thereby most probably resulting in the rejection of the first processed stack of slices 46 as being underweight.

When the number of input pulses from the transducer 1204 equals the preset number of slices, the counter 1202 reaches coincidence and generates an output pulse to a bistable multivibrator or flip-flop 1216 which is thereby switched to its second of two states. In response to its being switched to its second state, the bistable multivibrator 1216 provides an output signal to a reset time delay 1218, a stacker clutch control 1220 and a time delay 1222. The reset time delay 1218 delays the output pulse from the bistable multivibrator 1216 for a very brief period of time and then directs that output pulse back to the counter 1202 and the bistable multivibrator 1216 to reset the counter 1202 to its preselected slice count and the bistable multivibrator 1216 to its first of two states.

The output pulse from the bistable multivibrator 1216 to the stacker clutch control 1220 deenergizes the clutch 202 to prevent the stacker carriage 160 from being further driven in a downward direction by the stacker motor 206 and to permit the carriage 160 to be returned to its initial position by the force of the return spring 182. The stacker clutch control 1220 may alternately deenergize the clutch 202 in response to signals received from either the start-up inhibit control 1212 or the stacker clutch cut-off control switch 1118. The time delay 1222 prevents the right and left platens or paddles 192R and 192L from depositing a stack of slices 46 at the weighing mechanism 48 before the carriage 160 has reached its lowermost point of travel.

After being delayed by the time delay 1222, the output pulse from the bistable multivibrator 1216 switches a bistable multivibrator or flip-flop 1224 to its second of two states. As a result of being switched to its second of two states, the bistable multivibrator 1224 provides an input signal to a pulse generator 1226 which immediately generates output pulses at a preselectable frequency of, for example, 125 to 225 pulses per second. The output pulses from the pulse generator 1226 are directed through a triple pole, triple throw switch 1228 to a paddle stepper control 1230. In response to each input pulse, the paddle stepper control 1230 pulses both a right paddle stepper driver 1232 and a left paddle stepper driver 1234.

In response to each input pulse from the paddle stepper control 1230, the right paddle stepper driver 1232 energizes a right stepper motor 187 to rotate the right platen or paddle 192R 15°. Similarly, for each input pulse from the paddle stepper control 1230, the left paddle stepper driver 1234 energizes a left stepper motor 186 to rotate the left platen or paddle 192L 15°.

The output pulses from the pulse generator 1226 are further directed to a pulse counter 1240 which is preset to provide an output coincidence pulse after receiving eight input pulses. The pulse counter 1240 arrives at coincidence after receiving eight input pulses from the pulse generator 1226 and at that time resets itself and provides an output pulse to reset the bistable multivibrator 1224 to its first of two states, to deenergize the pulse generator 1226 and to energize a reverse pulse generator 1242. The reverse pulse generator 1242 provides an oppositely directed pulse on the trailing end of each eighth consecutive pulse from the pulse generator 1226. This oppositely directed pulse is directed to the paddle stepper control 1230 and through the stepper drivers 1232 and 1234 and causes a braking effect on the right stepper motor 187 and the left stepper motor 186 to prevent the right and left platens or paddles 192R and 192L from rotating more than 120°.

Since the stacking mechanism 44 includes three sets of platens or paddles radially disposed 120° apart, rotating one set of platens or paddles 120° causes that set to move out of a substantially horizontal position and past a true vertical position to thereby discharge or transfer a stack of slices 46 to the weighing mechanism 48. Further, the rotation of one set of platens or paddles 120 degrees from a substantially horizontal position brings a second set of platens or paddles into that position for receipt of the next stack of slices 46.

Either the right platen or paddle 192R or the left platen or paddle 192L may be rotated 15° in response to each closure of a manual stepper switch 1244. The stepper switch 1244 is, preferably, ganged with the triple pole, triple throw switch 1228 to enable their contacts to be moved by a single control switch 1245 on a main control panel (not shown). Thus, the switch 1245 may be turned from an at rest position to one of two alternate positions, one position being a right platen or paddle step and the other position being a left platen or paddle step. When the switch 1245 is turned to step the right platen or paddle 192R, the stepper switch 1244 is closed and the poles of the switch 1228 are moved to the upper contacts 1246. This results in a pulse being applied to the paddle stepper control 1230 which in turn energizes the right paddle stepper driver 1232 and the left paddle stepper driver 1234. With the poles of the switch 1228 in contact with the contacts 1246, only the right paddle stepper driver 1232 is able to energize the right stepper motor 187 to rotate the right platen or paddle 192R one step or 15°. When the switch 1245 is released, the poles of the switch 1228 are returned by a spring mechanism 1248 to their central position in contact with the contacts 1250.

When the switch 1245 is turned to step the left platen or paddle 192L, the switch 1244 is again closed and the poles of the switch 1228 are moved into contact with the contacts 1252. In such a position, only the left paddle stepper driver 1234 is able after energization by the paddle stepper control 1230 to energize the left stepper motor 186 to rotate the left platen or paddle 192L one step or 15°.

After a stack of slices 46 is deposited on the weighing mechanism 48, a control circuit 1300 determines the weight of the stack of slices 46 and the amount of deviation from the preselected weight. The control circuit 1300 in a preferred embodiment includes a linear voltage differential transformer 1302 for determining the error, if any, in the weight of a stack of slices 46 from the preselected weight.

A typical linear voltage differential transformer 1302 includes a primary coil and a pair of linearly disposed, oppositely poled secondary coils connected together. An alternating current input signal to the primary of the transformer 1302 from an oscillator 1304 is coupled through the magnetic core of the transformer 1302 to one or both of the secondary coils of the transformer 1302. Preferably, the magnetic core of the transformer 1302 is movable and connected to the movable scale platform 220. In its uppermost position, the magnetic core preferably induces all of the voltage from the primary coil into a first one of the two linearly disposed secondary coils. In its lowermost position, the magnetic coil preferably induces all of the voltage from the primary coil of the transformer 1302 into the second one of the linearly disposed, oppositely poled secondary coils. Since the secondary coils are oppositely poled, a signal from one of the secondary coils will be opposite in phase from the input signal to the primary of the transformer 1302. In its center position, the movable core would ideally induce an equal voltage into each of the secondary coils which would result in the voltage from each of the secondary coils cancelling the other voltage out. Thus, a xero voltage output would be obtained from the differential transformer 1302.

The linear voltage differential transformer 1302 could either be used to obtain the total weight of a stack of slices 46 or could be preadjusted to determine merely the error between the weight of the stack of slices 46 and the preselected weight. The output signal from the linear voltage differential transformer 1302 is directed to an alternating current to direct current (AC/DC) convertor 1306 which converts the in-phase or the out-of-phase alternating current voltage error signal from the linear voltage differential transformer 1302 to a positive or a negative direct current output voltage proportional to the magnitude of the input error signal.

If the linear voltage differential transformer 1302 is used to measure the total weight of a stack of slices 46, the output signal from the convertor 1306 is applied to the input of a presettable analog error detector 1308. The error detector 1308 is presettable to a desired stack weight, for example, from 2 to 32 ounces per stack, to, in one embodiment, set an internal voltage level for comparing the input signal from the convertor 1306. Thus, the analog error detector 1308 may include a differential amplifier. Preferably, the error detector 1308 further includes a comparator circuit and an inhibit circuit to prevent errors of a predetermined magnitude from changing the speed of the slicer motor 40. For example, if a desired weight of a stack of slices 46 is 8.25 ounces, a weight range may be from 8.00 to 8.50 ounces maybe selected as an acceptable weight range. Since occasionally air pockets, fat pockets or liquid pockets are found in an elongated mass of a food product 32, a rather large deviation from the desired weight of a stack 46 may occur. Thus, a presettable lower limit of 7.5 ounces may be adopted and entered into the presettable analog error detector 1308 to prevent an error signal indicating a stack of slices 46 having a weight less than 7.5 ounces from changing the speed of the slicer motor 40. A suitable inhibit circuit for performing this function may include an AND gate circuit having an input from the comparator circuit and another input to receive the error signal. The AND gate circuit would preferably be of the type that would provide an output analog signal proportional to the input analog error signal if the error signal is below the preset maximum limit as determined by the comparator circuit.

The detector 1308 provides an output signal indicating that the weight of a stack of slices 46 is either heavier than or lighter than the preset desired weight to an error signal display amplifier 1400 for display by a digital display device 1500. The error in a weighted stack of slices 46 may be displayed by the digital display device 1500 in ounces of deviation from the preset desired weight.

The error signal from the detector 1308 is further directed to an error correction circuit 1600. The error correction circuit 1600 includes a presettable percent error correction control 1602. The control 1602 may be preset to utilize only a fractional portion of the incoming error signal from the circuit 1300. For example, the control 1602 may be preset to provide an output that represents only 25 percent of the incoming error signal.

The output of the control 1602 is directed to a constant time/variable amplitude to variable time/constant amplitude pulse convertor 1604. The pulse convertor 1604 is conventional, per se, and changes the constant time, variable amplitude error signal from the control 1602 to a constant amplitude, variable time output pulse.

Many different transistor or electrical hardware circuits may be utilized to achieve the transformation of the pulse convertor 1604. For example, one circuit may include a ramp or sawtooth voltage wave generator 1605 initiated by the leading edge of the error signal from the control 1602 and terminated when the voltage level of the ramp or sawtooth generated signal equals the level of the input error signal. The coincidence or equality of the level of the ramp or sawtooth voltage wave generated to the amplitude of the input error signal could be determined by a comparator or by a differential amplifier. When coincidence is reached, the comparator deenergizes the ramp or sawtooth generator 1605. Preferably, the generator 1605 is used to energize and deenergize a constant voltage source for providing an output constant voltage pulse during a time that the generator 1605 is operative. Alternately, for some embodiments, a pulse generator could be utilized to provide a variable number of output pulses depending upon the magnitude of the amplitude of the input error signal.

The variable time, constant amplitude output pulse from the pulse convertor 1604 is directed to a heavy/light/inhibit control switch 1606. The control switch 1606 controls the operation of two NAND gates 6108 and 1610. One output of the control switch 1606 provides a high positive voltage signal to one of the two inputs of each of the NAND gates 6108 and 1610.

If the weight of a stack of slices 46 is less than the preselected desired weight as determined by the circuit 1300, a "light" error signal at the input of the control switch 1606 causes a high positive output voltage pulse from the control switch 1606 having the same pulse width as the input pulse to the control switch 1606 from the pulse convertor 1604 to be applied to the second of the two inputs of the NAND gate 1610. Since the output of a NAND gate assumes a low or ground potential only when all of the inputs to the NAND gate are of a high positive potential, providing a high positive voltage on both of the inputs to the NAND gate 1610 drives the output of the NAND gate 1610 to a low or ground potential which in turn is directed to a "light" input of a potentiometer motor control 1612.

Similarly, if the weight of a stack of slices 46 is greater than the preselected desired weight, the resulting "heavy" error signal from the circuit 1300 is directed to the control switch 1606 to cause the control switch 1606 to apply a high positive voltage to the second of the two inputs of the NAND gate 1608. The pulse width or time of this high positive voltage pulse is identical to the pulse width or time of the input error pulse to the control switch 1606 from the plate convertor 1604. Since both of the inputs to the NAND gate 1608 are of a high voltage level, the output of the NAND gate 1608 is driven to a low or ground potential which in turn is applied to a "heavy" input of the potentiometer motor control 1612.

An end-of-loaf inhibit control 1614 detects the end of an elongated mass of a food product 32 as it is being fed into the path of the slicing knife 36 to inhibit the control switch 1606 and thereby remove the high positive voltage level applied to the first input of each of the NAND gates 1608 and 1610. By removing the high positive voltage level from each of the first inputs to the NAND gates 1608 and 1610, each of the outputs of the NAND gates 1608 and 1610 is maintained at a high positive voltage level to prevent the potentiometer motor control 1612 from responding to an error signal. Thus, the speed of the slicer motor 40 is not affected by an error in weight caused by an end of an elongated mass of a food product 32. The inhibit control 1614 could also be used in conjunction with the analog error detector 1308 in inhibiting an error of an undesired magnitude from affecting the speed of the slicer motor 40.

The potentiometer motor control 1612 controls a motorized potentiometer 1616 which includes a motor 1618 for moving a wiper arm of the error control signal generator or potentiometer 1620. The motor 1618 drives the movable arm of the generator 1620 in a first direction in response to a "heavy" command from the potentiometer motor control 1612 and in a second direction in response to a "light" command from the potentiometer motor control 1612. The motor 1618 is energized to move the movable arm of the generator 1620 for a period of time corresponding to the pulse width of the output pulse from the pulse convertor 1604. A "trend light" lamp 1622 or a "trend heavy" lamp 1624 is illuminated depending upon which side of a null position the movable arm of the generator 1620 is at a particular time. The lamps 1622 and 1624 indicate to an operator of the processing machine whether the weight of the stacks 46 being processed at that time are less than or lighter than the desired stack weight or greater than or heavier than the desired stack weight. A manual trend override circuit 1626 including a pair of switches 1628 is provided to enable an operator to more rapidly increase or decrease the speed of the slicer motor 40.

The error control signal generator 1620 provides an output error control signal to a motor control circuit 1700. The motor control circuit 1700 includes a slicer motor control 1702, a feeder-retractor motor control 1704, and a stacker motor control 1706. The motor controls 1702, 1704, and 1706 respectively control the energization of and the operational speed of the slicer motor 40, the feeder-retractor motor 70, and the stacker motor 206. The initial operating speeds of the motors 40, 70, and 206 are set by a plurality of potentiometers 1708. The potentiometers for setting the initial operating conditions of the feeder-retractor motor 70 and the stacker motor 206 are ganged together to coordinate the movement of the movable stacker carriage 160 with the rate of the feeder 34. The motor controls 1702, 1704, and 1706 are preferably commercially available servo-amplifiers or variable frequency feedback control units available from any one of a number of manufacturers. The motor controls 1702, 1704, and 1706 may be obtained as an integral servo-amplifier unit from the Hyper-Loop, Inc. of Bridgeview, Illinois, by reference to the model number HLI 1008. The Hyper-Loop device is further disclosed in U.S. Pat. No. 3,548,278.

After its initial operating speed is set by the potentiometer 1708, the speed of the slicer motor 40 may be increased or decreased by the slicer motor control 1702 in response to an error control input signal from the error control signal generator 1620. A plurality of tachometers 1710 monitor the actual operating speed of the motors 40, 70, and 206 and provide a feedback signal, respectively, to the controls 1702, 1704, and 1706 to thereby closely control the actual operating speed of these three motors. A potentiometer 1712 connected in parallel with the slicer motor tachometer 1710 enables the number of slices per minute being sliced by the slicing mechanism 36 to be visually displayed by the digital display 1500. Similarly, a potentiometer 1714 enables the feeding rate of the feeding mechanism 34 to be visually displayed in inches per minute by the digital display 1500.

In order to transfer a stack of slices from the weighing mechanism 48 to the product discharge conveyor 52, a transfer mechanism 50 is utilized under the control of a transfer mechanism control circuit 1800. The transfer mechanism control circuit 1800 includes a variable time delay 1802 to enable the stack of slices 46 deposited by the stacking mechanism 44 on the weighing mechanism 48 to settle to achieve an accurate reading. The time delay 1802 delays the output pulse from the time delay 1222 from energizing a sample timer 1804. The actual time delay of the variable time delay 1802 may be varied depending upon the preselected number of slices per stack to be formed by the slicing mechanism 36. For example, time delays of 240 milliseconds for two through seven slices, 360 milliseconds for eight through twelve slices, and 540 milliseconds for thirteen through twenty-nine slices have been found acceptable. The actual time delay of the variable time delay 1802 may be set by entering the desired number of slices per stack into the presettable slice counter 1202.

An additional time delay 1806 is provided to allow the stacking mechanism 44 to deposit a stack of slices 46 on the weighing mechanism. The time delay 1806 provides a suitable delay of, for example, 120 milliseconds, before energizing a transfer advance solenoid control 1808 in response to the delayed output pulse from the time delay 1222. The transfer advance solenoid control 1808 causes the transfer mechanism 50 to advance to the weighing mechanism 48 and to there underlie a stack of slices 46 in a nonengaging position.

After the time period of the time delay 1802 expires, the sample timer 1804 is energized to enable the presettable percent error correction control 1602 to provide an input error pulse to the pulse convertor 1604 of a constant pulse width or time. For example, the sample timer 1804 may be set at 100 milliseconds to provide an input error pulse to the pulse convertor 1604 from the control 1602 of a pulse width or time or exactly 100 milliseconds.

After expiration of its time period, the sample timer 1804 energizes a transfer retract solenoid control 1810 to engage the stack of slices 46 on the weighing mechanism 48, to transfer the stack of slices 46 to the product accept-reject mechanism 51, and to deposit the stack of slices 46 on the transfer conveyor 240. The solenoid controls 1808 and 1810 energize or deenergize a pair of solenoids that are used to control the pneumatic valve 238. The valve 238 in turn controls the transfer carriage control cylinder 236 which through various linkages controls the reciprocating movements of the transfer mechanism 50.

The transfer advance solenoid control 1808 energizes one of two solenoids controlling the position of the pneumatic valve 238 for operating the transfer carriage control cylinder 236 to advance the transfer carriage 234 to the weighing mechanism 48. At the weighing mechanism 48, the transfer carriage 234 maintains a nonengaged, underlying relationship with respect to the stack of slices 46 being weighed by the weight cell 228.

After the expiration of the time period of the sample timer 1804, the transfer return solenoid control 1810 is pulsed to energize the second of the two solenoids controlling the position of the pneumatic valve 238 to cause the transfer of the carriage control cylinder 236 to move the transfer carriage 234 along its return stroke. The return stroke of the transfer carriage 234 includes a pick-up step in which the weighed stack of slices 46 is removed from the scale platform 220, a retract step in which the transfer carriage 234 is retracted from the weighing mechanism 48 to a position overlying the transfer conveyor 240, and a deposit step in which the transfer carriage 234 is returned to its at rest position below the transfer conveyor. During the deposit step, the stack of slices 46 is deposited on the transfer conveyor 240 for delivery to the product accept-reject conveyor 242.

A product accept-reject control circuit 1900 controls the placement of a weighed stack of slices 46 on the acceptance path of the product discharge conveyor 52 or on the rejection path of the product discharge conveyor 52. The control circuit 1900 includes a presettable "light" reject control 1902 and a similar presettable "heavy" reject control 1904. As part of the initial setting up of the processing machine, the acceptance weight range for a stack of slices 46 is programmed into the control circuit 1000. A lower weight range limit is entered into the control 1902 and an upper weight range limit is entered into the control 1904. The controls 1902 and 1904 may consist each of either a conventional potentiometer or comparator circuit.

The controls 1902 and 1904 control a NOR gate 1906, the output of which controls the energization or deenergization of a relay 1908. The output of the NOR gate 1906 assumes a high positive voltage level only when both of its inputs from the controls 1902 and 1904 are at a low or ground potential. A plurality of inverting amplifiers 1910 inverts the output signals from the controls 1902 and 1904 and the NOR gate 1906 to controllably energize or deenergize a plurality of indicating lamps 1912.

Both inputs to the NOR gate 1906 from the controls 1902 and 1904 assume a low or ground potential only when the weight of a stack of slices 46 is within the preset acceptable weight range. If the weight of a stack of slices 46 is within the predetermined acceptable weight range, both of the inputs to the NOR gate 1906 assume a low or ground potential thereby driving the output of the NOR gate 1906 to a high positive voltage level. This high positive voltage level on the output of the NOR gate 1906 is inverted by the amplifier 1910 to a low or ground potential at the output of the inverter 1910. This low or ground potential enables a current to flow through and thereby light the "accept" lamp 1912.

This low or ground potential at the output of the inverting amplifier 1910 also energizes the relay 1908 to thereby pulse a timed product accept solenoid control 1914. When energized, the timed product accept solenoid control 1914 energizes the product accept-reject solenoid 244 to move the shaft 326 of the product accept-reject conveyor 242 against the force of the biasing spring 330 to deposit a weighed stack of slices 46 along the acceptance path of the product discharge conveyor 52. After discharge of the weighed stack of slices 46 along the acceptance path of the product discharge conveyor 52, the product accept-reject conveyor, after the deenergization of the solenoid 244 by the control 1914, is returned to its normal position in alignment with the rejection path of the product discharge conveyor 52 by the spring 330.

If the weight of a stack of slices 46 is less than the lower limit of the preset acceptable weight range, the output of the control 1902 is maintained at a relatively high positive voltage level which after inversion by the amplifier 1910 causes the "light" reject lamp 1912 to light and further prevents the energization of the relay 1908. Since the timed product accept solenoid control 1914 is not energized, the product accept-reject solenoid 244 is not energized and the underweight stack of slices 46 is delivered by the conveyor 242 to the rejection path of the product discharge conveyor 52.

Similarly, if the weight of a stack of slices 46 is greater than the upper limit of the preset weight range, the output of the control 1904 is maintained at a relatively high positive voltage level to light the "heavy" reject lamp 1912 after inversion by the amplifier 1910 and to also maintain the relay 1908 deenergized. Since the relay 1908 is deenergized, the product accept-reject solenoid 244 is not energized by the solenoid control 1914 thereby causing the overweight stack of slices 46 to be delivered by the product accept-reject conveyor 242 to the discharge path of the product discharge conveyor 52.

Obviously, many modifications and variations are possible in light of the above disclosure. Thus, it is to be understood that, within the scope of the appended claims, the invention may be practiced otherwise and as specifically described.

What is claimed and desired to be secured by Letters Patent of the United States is:

1. Apparatus for cutting slices from an elongated preformed loaf of compressible product having a substantially uniform cross-section, said apparatus comprising a knife rotatable around a cutting path, means for forcing said loaf along a feed path intersecting said cutting path to cause successive slices to be cut from said loaf, and an orifice ring positioned across said feed path at its discharge end and formed with a restricted orifice for compressively holding said mass and guiding said loaf into closely adjacent cutting engagement with said knife.

2. The apparatus of claim 1 wherein said orifice is tapered inwardly in the direction of the feeding of said loaf.

3. The apparatus of claim 1 wherein said orifice has a shape conforming substantially to the shape of the cross-section of said loaf and is slightly smaller in size to compress said loaf as the loaf moves along said feed path toward said cutting path.

4. The apparatus of claim 1 wherein the margin of said orifice is positioned to provide a shearing surface cooperating with said knife in the cutting of successive slices from said loaf.

5. The apparatus of claim 1 wherein said feed path is directed downwardly toward said cutting path.

6. A method of cutting successive slices from an elongated preformed loaf of compressible product having a substantially uniform cross-section comprising the steps of forcibly feeding the loaf along a feed path, and through a restrictive orifice formed in an orifice ring positioned across said feed path at its discharge end thereby compressively holding said loaf, and cutting successive slices from a portion of the loaf passed through the orifice.

7. The method of claim 6 wherein said loaf is compressed transversely toward a central portion of said feed path as said loaf is fed through said orifice.

8. The method of claim 7 wherein said cutting is accomplished in a cutting path closely adjacent to the margin of said orifice where said loaf is under compression.

9. The method of claim 8 wherein said loaf is held under compression longitudinally as each slice is cut.

10. Apparatus for cutting successive slices from an elongated preformed loaf of food product or the like having a substantially uniform transverse cross-section comprising an orifice ring defining a mass compressing orifice having an entrance side and an exit side, cutting means movable in a cutting path closely adjacent said exit side to shear successive slices from said loaf protruding beyond said exit side of said orifice, and means forcing said loaf in a longitudinal direction through said orifice.

11. The apparatus of claim 10 wherein said orifice is formed by an annular wall tapering between a larger opening area adjacent said entry side to a smaller opening area adjacent said exit side to increase the compression on said loaf as said loaf passes through said orifice.

12. The apparatus of claim 11 wherein said wall is disposed to provide a shearing edge cooperating with said cutting means.

13. The apparatus of claim 12 wherein said cutting means includes a cutting edge rotating around an axis spaced eccentrically of the path traversed by a loaf passing through said orifice.

14. The apparatus of claim 1 wherein said orifice ring is interchangeable with another orifice ring formed with a restrictive orifice having different dimensions.

* * * * *